United States Patent
Nakamura et al.

(10) Patent No.: US 10,417,290 B2
(45) Date of Patent: Sep. 17, 2019

(54) INFORMATION PROVIDING SYSTEM, INFORMATION PROVIDING SERVER AND INFORMATION PROVIDING METHOD FOR AUTOMATICALLY PROVIDING SEARCH RESULT INFORMATION

(71) Applicant: YAHOO JAPAN CORPORATION, Tokyo (JP)

(72) Inventors: Yuichi Nakamura, Tokyo (JP); Shinichiro Yasui, Tokyo (JP); Kazuo Yamashita, Tokyo (JP); Masashi Kusano, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 600 days.

(21) Appl. No.: 14/846,338

(22) Filed: Sep. 4, 2015

(65) Prior Publication Data

US 2016/0078105 A1 Mar. 17, 2016

(30) Foreign Application Priority Data

Sep. 11, 2014 (JP) .................................. 2014-184837

(51) Int. Cl.
*G06F 16/9535* (2019.01)
*G06F 16/955* (2019.01)

(52) U.S. Cl.
CPC ........ *G06F 16/9535* (2019.01); *G06F 16/955* (2019.01)

(58) Field of Classification Search
None
See application file for complete search history.

(56) References Cited

U.S. PATENT DOCUMENTS

| | | | | |
|---|---|---|---|---|
| 8,589,399 B1* | 11/2013 | Lee | ................... | G06F 17/30616 707/737 |
| 8,762,365 B1* | 6/2014 | Pantel | ............... | G06F 17/30873 707/710 |
| 8,909,655 B1* | 12/2014 | McDonnell | ....... | G06F 17/30241 707/748 |
| 2008/0091443 A1* | 4/2008 | Strope | ................. | G06Q 10/103 705/301 |
| 2009/0043749 A1* | 2/2009 | Garg | ................. | G06F 17/30672 |
| 2010/0211588 A1* | 8/2010 | Jiang | ................. | G06F 17/30637 707/768 |
| 2011/0022563 A1* | 1/2011 | Matsubara | .......... | G06F 17/3097 706/50 |

(Continued)

FOREIGN PATENT DOCUMENTS

JP 2002-236684 A 8/2002

*Primary Examiner* — Christopher J Raab
(74) *Attorney, Agent, or Firm* — Oliff PLC

(57) ABSTRACT

A detailed information providing server includes: an acquisition unit configured to acquire search log information in which a search query is associated with link destination information of a search result obtained by a search using the search query; and a storage unit configured to determine whether or not a keyword corresponding to the search query is included in a news article available on the Internet, and store detailed information in association with the news article into an associated information DB when determining that the keyword is included, the detailed information being acquired by making access according to the link destination information associated with the search query.

12 Claims, 22 Drawing Sheets

(56) References Cited

U.S. PATENT DOCUMENTS

| | | | |
|---|---|---|---|
| 2011/0161336 A1* | 6/2011 | Shiga | G06F 17/30864 |
| | | | 707/758 |
| 2012/0290575 A1* | 11/2012 | Hu | G06F 17/30646 |
| | | | 707/737 |
| 2013/0080422 A1* | 3/2013 | Pan | G06Q 30/00 |
| | | | 707/722 |
| 2015/0347503 A1* | 12/2015 | Kumaran | G06F 17/30401 |
| | | | 707/767 |

* cited by examiner

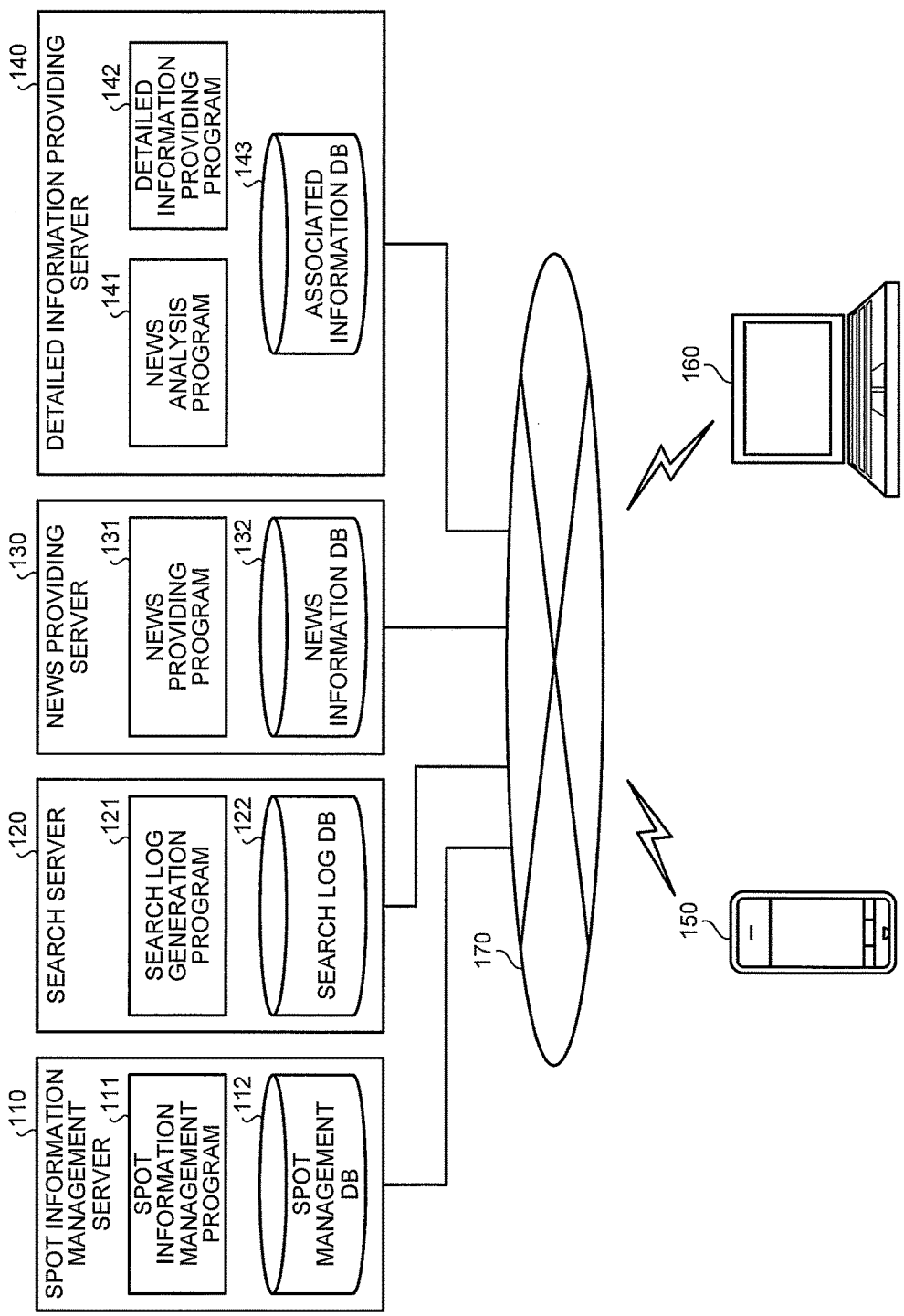

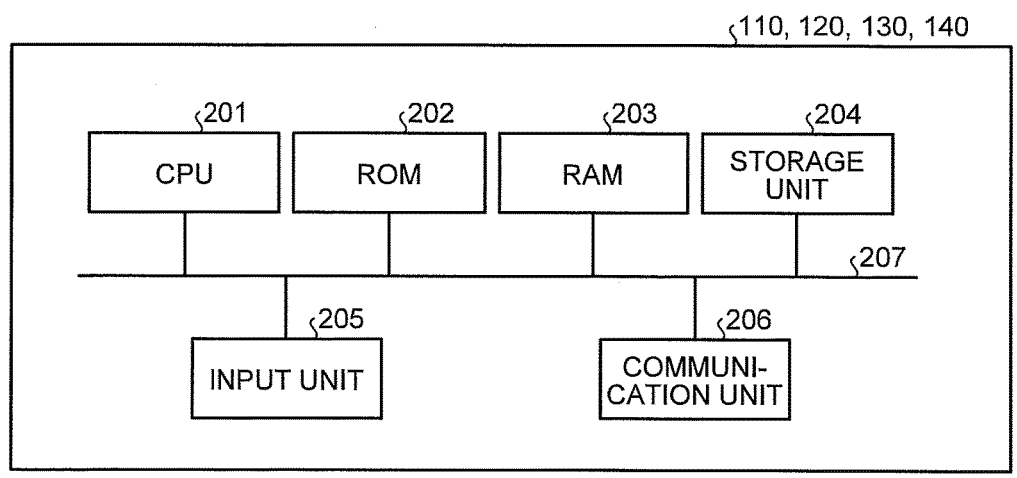
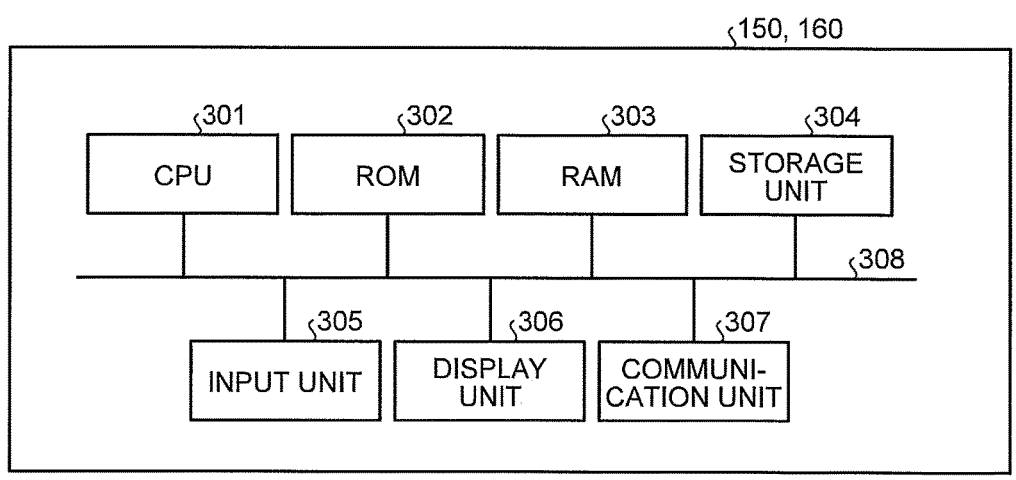

FIG.4

| FACILITY NAME OR STORE NAME | URL | ADDRESS | PHONE NUMBER | LATITUDE/ LONGITUDE | BUSINESS CATEGORY | BUSINESS HOURS | MENU | REPUTA-TION | IMAGE DATA | ... | MAP GUIDE |
|---|---|---|---|---|---|---|---|---|---|---|---|
| α α α | URL_I | | | | | | | | | ... | |
| β β β | URL_IV | | | | | | | | | ... | |
| γ γ γ | URL_III | | | | | | | | | ... | |
| | | | | | | | | | | | |
| | | | | | | | | | | | |

| SEARCH QUERY | HIT COUNT | URL | CLICK COUNT |
|---|---|---|---|
| AA BBB | | URL_III | 1831 |
| | | URL_II | 347 |
| | | ⋮ | ⋮ |
| AA CCC | | URL_I | 1521 |
| | | URL_III | 1350 |
| | | ⋮ | ⋮ |
| DDDD EEE | | URL_IV | 2581 |
| | | URL_III | 1869 |
| | | ⋮ | ⋮ |

FIG.7

| NEWS ARTICLE | NEWS INFORMATION ID | SEARCH QUERY | DETAILED INFORMATION |
|---|---|---|---|
| ☐☐☐☐ RELEASED!!......... | NEWS X | AA CCC | STORE NAME: α α α α<br>ADDRESS: ......<br>PHONE NUMBER: ...... |
| FIRST DOMESTIC STORE OF △△△ IS NOW OPEN IN ○○...... | NEWS Y | DDDD EEE | STORE NAME: β β β β<br>ADDRESS: ......<br>PHONE NUMBER: ...... |

NEWS INFORMATION ID: NEWS Z
DISTRIBUTION SOURCE: ○○ PAPER
DISTRIBUTION DATE AND TIME: JULY 17, 2014 AT 4:15 PM
URL: http://headlinenews...

□□□□ RELEASED!!

·················AA·····················

····································································

·····BBB····························································

····································································

····································································

····································································

·········································CCC·

| NEWS ARTICLE | NEWS INFOR-MATION ID | SEARCH QUERY | DETAILED INFORMATION | SCORE |
|---|---|---|---|---|
| □□□□ RELEASED!!......... | NEWS X | AA CCC | STORE NAME: α α α α<br>ADDRESS: ......<br>PHONE NUMBER: ...... | |
| FIRST DOMESTIC STORE OF △△△ IS NOW OPEN IN ○○...... | NEWS Y | DDDD EEE | STORE NAME: β β β β<br>ADDRESS: ......<br>PHONE NUMBER: ...... | |
| □□□□ RELEASED!!......... | NEWS Z | AA CCC | STORE NAME: α α α α<br>ADDRESS: ......<br>PHONE NUMBER: ...... | 25 |
| | | AA BBB | STORE NAME: γ γ γ γ<br>ADDRESS: ......<br>PHONE NUMBER: ...... | 41 |
| | | | | |
| | | | | |

NEWS INFORMATION ID: NEWS Z
DISTRIBUTION SOURCE: ○○ PAPER
DISTRIBUTION DATE AND TIME: JULY 17, 2014 AT 4:15 PM
URL: http://headlinenews...

□□□□ RELEASED!!

・・・・・・・・・・・・・・・・・・・・AA・・・・・・・・・・・・・・・・・・・
・・・・・・・・・・・・・・・・・・・・・・・・・・・・・・・・・・・・・・・・・・・
・・・・・・・・・・・・・・・・・・・・・・・・・・・・・・・・・・・・・・・・・・・
・・・・・・α α α α (TOKYO STATION)・・・・・・・・・・・・・・・・
・・・・・・・・・・・・・・・・・・・・・・・・・・・・・・・・・・・・・・・・・・・
・・・・・・・・・・・・・・・・・・・・・・・・・・・・・・・・・・・・・・・・・・・
・・・・・・・・・・・・・・・・・・・・・・・・・・・・・・・・・・・・・・・・・・・
・・・・・・・・・・・・・・・・・・・・・・・・・・・・・・・・・・・・・・・・・・・
・・・・・・・・・・・・・・・・・・・・・・・・・・・・・・・・・・・・・・CCC・
・・・・・・・・・・・・・・・・・・・・・・・・・・・・・・・・・・・・・・・・・・・
・・・・・・・・・・・・・・・・・・・・・・・・・・・・・・・・・・・・・・・・・・・
・・・・・・・・・・・・・・・・・・・・・・・・・・・・・・・・・・・・・・・・・・・
・・・・・・・・・・・・・・・・・・・・・・・・・・・・・・・・・・・・・・・・・・・
・・・・・・・・・・・・・・・・・・・・・・・・・・・・・・・・・・・・・・・・・・・
・・・・・・・・・・・・・・・・・・・・・・・・・・・・・・・・・・・・・・・・・・・

FIG.18

| NEWS ARTICLE | NEWS INFORMATION ID | SEARCH QUERY | SPOT CANDIDATE | DETAILED INFORMATION |
|---|---|---|---|---|
| ☐☐☐☐ RELEASED!!······ | NEWS X | AA CCC | | STORE NAME: α α α α<br>ADDRESS: ······<br>PHONE NUMBER: ······ |
| FIRST DOMESTIC STORE OF △△△ IS NOW OPEN IN ○○······ | NEWS Y | DDDD EEE | | STORE NAME: β β β β<br>ADDRESS: ······<br>PHONE NUMBER: ······ |
| ☐☐☐☐ RELEASED!!······ | NEWS Z | AA CCC | | STORE NAME: α α α α<br>ADDRESS: ······<br>PHONE NUMBER: ······ |
| | | | α α α α | STORE NAME: α α α α<br>ADDRESS: ······<br>PHONE NUMBER: ······ |
| | | | | |

1800

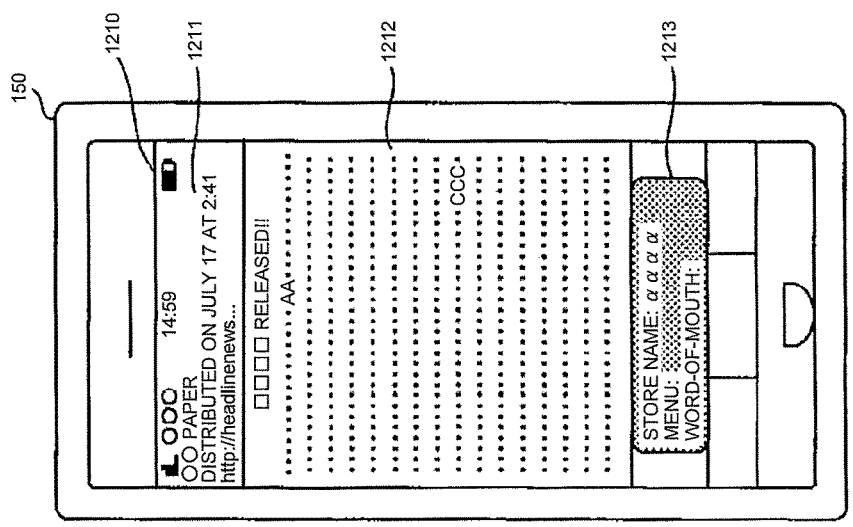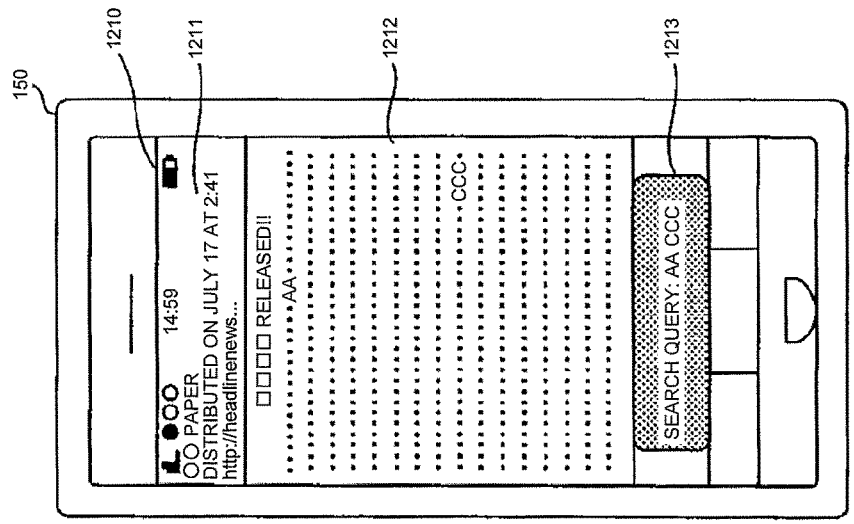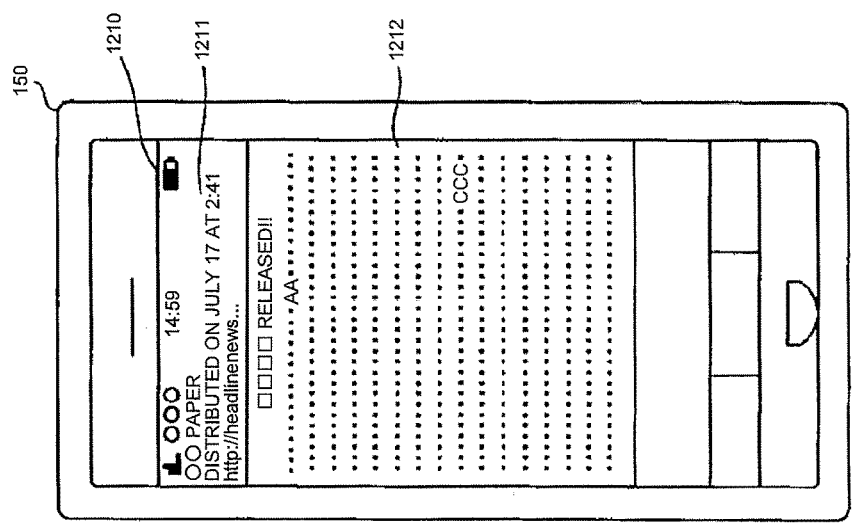

NEWS INFORMATION ID: NEWS Z
DISTRIBUTION SOURCE: ○○ PAPER
DISTRIBUTION DATE AND TIME: JULY 17, 2014 AT 4:15 PM
URL: http://headlinenews...

□□□□ RELEASED!!

················AA·················

······α α α α (TOKYO STATION)···········

······················CCC·

600

NEWS INFORMATION ID: NEWS X
DISTRIBUTION SOURCE: ○○ PAPER
DISTRIBUTION DATE AND TIME: JULY 17, 2014 AT 2:41 PM
URL: http://headlinenews...

□□□□ RELEASED!!

················AA·················

······················CCC·

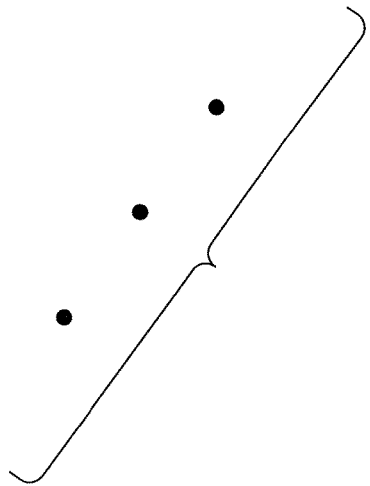

FIG.23

| NEWS ARTICLE | NEWS INFORMATION ID | SEARCH QUERY | SPOT CANDIDATE | DETAILED INFORMATION |
|---|---|---|---|---|
| ▢▢▢▢ RELEASED!!....... | NEWS X | AA CCC | | STORE NAME: α α α α<br>ADDRESS: ......<br>PHONE NUMBER: ...... |
| FIRST DOMESTIC STORE OF △△△ IS NOW OPEN IN ○○........ | NEWS Y | DDDD EEE | α α α α | STORE NAME: α α α α<br>ADDRESS: ......<br>PHONE NUMBER: ...... |
| ▢▢▢▢ RELEASED!!....... | NEWS Z | AA CCC | | STORE NAME: β β β β<br>ADDRESS: ......<br>PHONE NUMBER: ...... |
| | | | | STORE NAME: α α α α<br>ADDRESS: ......<br>PHONE NUMBER: ...... |
| | | | α α α α | STORE NAME: α α α α<br>ADDRESS: ......<br>PHONE NUMBER: ...... |

2300

INFORMATION PROVIDING SYSTEM, INFORMATION PROVIDING SERVER AND INFORMATION PROVIDING METHOD FOR AUTOMATICALLY PROVIDING SEARCH RESULT INFORMATION

CROSS-REFERENCE TO RELATED APPLICATION(S)

The present application claims priority to and incorporates by reference the entire contents of Japanese Patent Application No. 2014-184837 filed in Japan on Sep. 11, 2014.

BACKGROUND OF THE INVENTION

1. Field of the Invention

The present invention relates to an information providing system, an information providing server and an information providing method.

2. Description of the Related Art

One has been able to view various pieces of information published on the Internet by connecting an information terminal or the like to the Internet. Moreover, one can easily acquire various pieces of accessory information linked to the information being viewed (such as a map image linked to information indicating a location included in the information being viewed).

Patent Literature 1: Japanese Laid-open Patent Publication No. 2002-236684

However, when the information published on the Internet is a news article published on a news site, for example, it is often the case that detailed information itself such as a location desired by a user is not usually included. A news article introducing a product often includes a general description of a spot selling the product but does not include detailed information (an official name, the location such as an address, and contact information such as a phone number of a store), for example.

Therefore, the user viewing such news article has to think of a search query on the basis of what is described in the news article and perform a web search in order to acquire the detailed information (the official name, location and contact information of the sales spot in this case).

On the other hand, the user is expected to experience improved convenience in acquiring information when the detailed information desired by the user viewing the news article or the like can be specified on the basis of the news article or the like and automatically provided to the user.

SUMMARY OF THE INVENTION

It is an object of the present invention to at least partially solve the problems in the conventional technology.

According to one aspect of an embodiment, an information providing server includes an acquisition unit configured to acquire search log information in which a search query is associated with link destination information of a search result obtained by a search using the search query and a first storage unit configured to determine whether or not a keyword corresponding to the search query is included in text data available on a network, and store detailed information in association with the text data when determining that the keyword is included, the detailed information being acquired by making access according to the link destination information associated with the search query.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a diagram illustrating an overall configuration of an information providing system;

FIG. 2 is a diagram illustrating a hardware configuration of each server included in the information providing system;

FIG. 3 is a diagram illustrating a hardware configuration of each terminal included in the information providing system;

FIG. 4 is a table illustrating an example of spot management information;

FIG. 5 is a table illustrating an example of search log information;

FIG. 7 is a table illustrating an example of associated information;

FIG. 13 is a diagram illustrating an example of news information;

FIG. 14 is a table illustrating an example of associated information;

FIG. 16 is a diagram illustrating an example of news information;

FIG. 18 is a table illustrating an example of associated information;

FIGS. 21A to 21C are diagrams each illustrating a display example of a display screen on a mobile terminal;

FIG. 22 is a diagram illustrating an example of news information; and

FIG. 23 is a table illustrating an example of associated information.

DETAILED DESCRIPTION OF THE PREFERRED EMBODIMENTS

Figure 6:
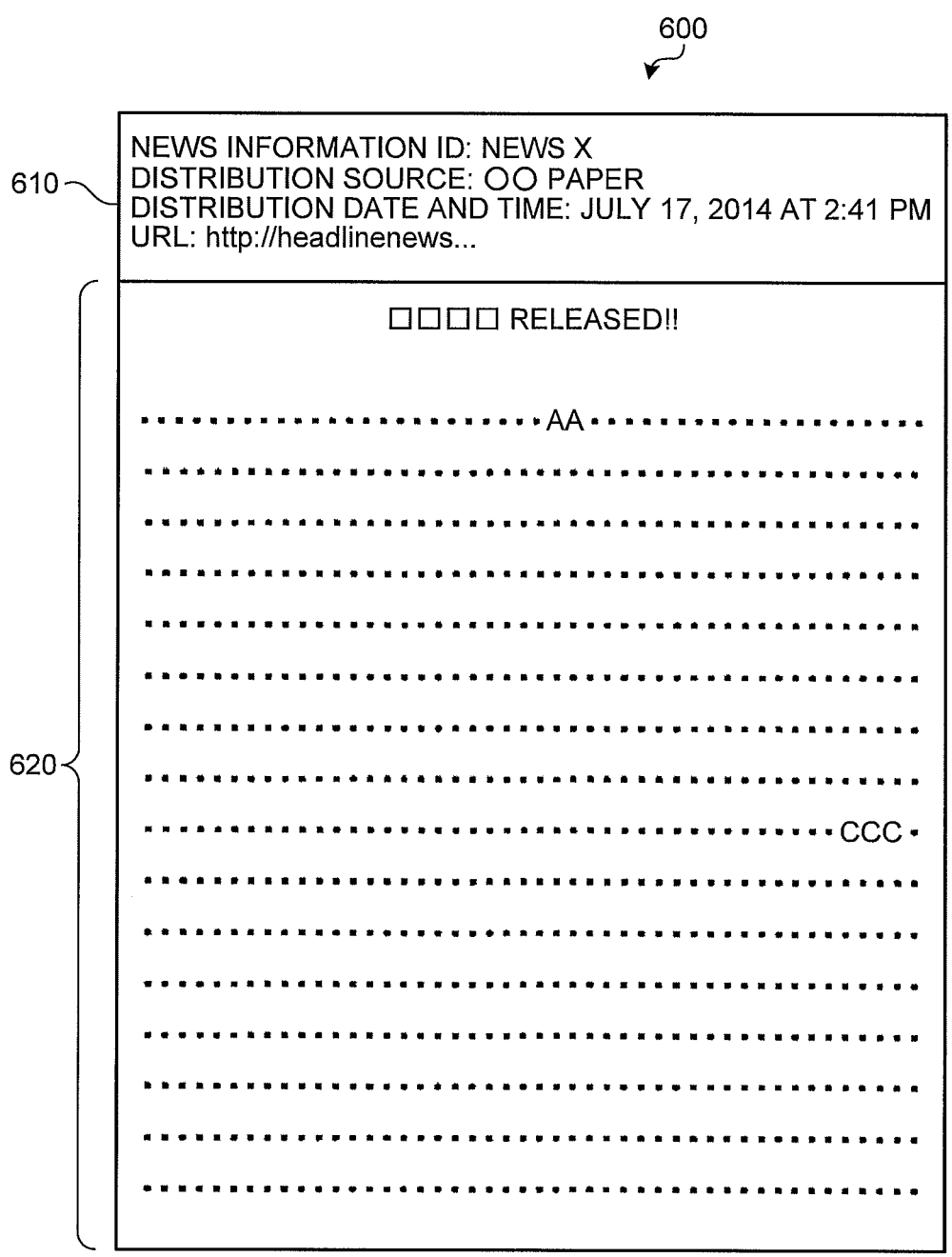
FIG. 6 is a diagram illustrating an example of news information.

First, an overview of each embodiment will be described. A detailed information providing server according to each embodiment below uses search log information relevant to a search query that is used in performing a web search on a network (on the Internet) in order to specify detailed information desired by a user viewing a news article or the like.

The search query is used to acquire some information on the Internet, where a search query with high frequency of use is an expression used to search for a target being the detailed information desired by many people. Accordingly, when a news article or the like includes an expression (keyword) identical to the expression forming the search query with high frequency of use, there is a high probability that a user viewing the news article or the like performs a web search by using the expression as the search query. That is, when the news article or the like includes the expression identical to the search query with high frequency of use, information derived from a search result obtained by the search query is highly likely the detailed information itself desired by the user viewing the news article or the like.

Now, the detailed information providing server according to each embodiment below is adapted to use search log information of the search query and specify the detailed information desired by the user viewing the news article or the like.

Details of each embodiment will now be described with reference to the drawings. Note that a component having substantially the same functional configuration in the description and drawings according to each embodiment will have the same reference numeral to omit redundant description.

First Embodiment

1. Overall Configuration of Information Providing System

FIG. 1 is a diagram illustrating an overall configuration of an information providing system 100. As illustrated in FIG. 1, the information providing system 100 includes a spot information management server 110, a search server 120, a news providing server 130, and a detailed information providing server 140. The information providing system 100 also includes a mobile terminal 150 such as a smart phone and an information terminal 160 such as a laptop. Each server (the spot information management server 110, the search server 120, the news providing server 130, and the detailed information providing server 140) and each terminal (the mobile terminal 150 and the information terminal 160) in the information providing system 100 are connected through the Internet 170 to be able to communicate with each other. While two terminals (the mobile terminal 150 and the information terminal 160) are included in the information providing system 100 in the example illustrated in FIG. 1, a different number of terminals may be included in the information providing system 100 as well. The terminal type is not limited to the mobile terminal and the information terminal, either.

The spot information management server 110 includes a spot information management program 111 and a spot management database (hereinafter simply abbreviated as a DB) 112. The spot information management program 111 generates spot management information by collecting information on a spot including various facilities and stores, and stores the information into the spot management DB 112. In response to an acquisition request from the detailed information providing server 140, the spot information management program transmits the spot management information stored in the spot management DB 112 to the detailed information providing server 140. The spot management DB 112 stores the spot management information generated by the spot information management program 111.

The search server 120 includes a search log generation program 121 and a search log DB 122. The search log generation program 121 generates search log information and stores it into the search log DB 122 when a user inputs a search query on each terminal and gives a search instruction so that the search server 120 performs search processing, the search log information including details of the search processing as a history. Moreover, in response to an acquisition request from the detailed information providing server 140, the search log generation program transmits the search log information stored in the search log DB 122 to the detailed information providing server 140. The search log DB 122 stores the search log information generated by the search log generation program 121.

The news providing server 130 includes a news providing program 131 and a news information DB 132. The news providing program 131 acquires news information transmitted from a distribution source (not shown) of a news article and stores the acquired news information into the news information DB 132. Moreover, the news providing program 131 provides a news site on which a user views the news article of the news information stored in the news information DB 132. As a result, a user of each terminal can view a desired news article stored in the news information DB 132 upon transmitting, from each terminal, a request to view the news article to the news site (in other words, the news providing server functions as a storage server as well).

When acquiring the news information from the distribution source, the news providing program 131 notifies the detailed information providing server 140 that the news information is newly acquired. When a request to acquire the newly acquired news information is transmitted from the detailed information providing server 140 in response to the notification, the newly acquired news information is transmitted to the detailed information providing server 140.

The detailed information providing server 140 includes a news analysis program 141, a detailed information providing program 142 and an associated information DB 143. Upon receiving the notification from the news providing server 130 that the news information is newly acquired, the news analysis program 141 transmits a request to acquire the news information to the news providing server 130. The news analysis program also transmits a request to acquire latest spot management information and search log information to the spot information management server 110 and the search server 120, respectively.

Moreover, the news analysis program 141 analyzes the news article of the news information acquired from the news providing server 130 and determines whether or not an expression identical to a search query with high frequency of use is included in the news article. When determining that the expression is included in the news article, the news analysis program identifies a URL of a search result obtained by using the search query on the basis of the search log information, and extracts information related to a spot having the identified URL from the spot management information. The news analysis program then stores, into the associated information DB 143, the information related to the extracted spot as detailed information desired by a user viewing the news article in association with the news article.

Upon detecting that a request to view the news article is made from a terminal to the news providing server 130, the detailed information providing program 142 transmits to the terminal the detailed information stored in the associated information DB 143 in association with the news article for which the viewing request is made.

The associated information DB 143 stores associated information in which the news article is associated with the detailed information desired by the user viewing the news article.

Each of the mobile terminal 150 and the information terminal 160 has a browser function to connect to the Internet 170 and view information published for viewing on the Internet (such as a news article published on a news site provided by the news providing server 130).

2. Hardware Configuration of Each Server

Next, there will be described a hardware configuration of each server (the spot information management server 110, the search server 120, the news providing server 130, and the detailed information providing server 140). FIG. 2 is a diagram illustrating the hardware configuration of each server.

As illustrated in FIG. 2, each server includes a CPU (Central Processing Unit) 201, a ROM (Read Only Memory) 202, a RAM (Random Access Memory) 203, and a storage unit 204. Each server further includes an input unit 205 and a communication unit 206. Each unit of each server is mutually connected through a bus 207.

The CPU 201 is a computer executing various programs (the spot information management program 111, the search log generation program 121, the news providing program 131, the news analysis program 141, and the detailed information providing program 142) stored in the storage unit 204.

The ROM 202 is a non-volatile memory. The ROM 202 stores various programs and data required for the CPU 201 to execute the various programs stored in the storage unit 204. Specifically, the ROM stores a boot program such as a BIOS (Basic Input/Output System) and an EFI (Extensible Firmware Interface).

The RAM 203 is a main storage such as a DRAM (Dynamic Random Access Memory) or an SRAM (Static Random Access Memory). The RAM 203 functions as a work area developed when the CPU 201 executes the various programs stored in the storage unit 204.

The storage unit 204 stores the various programs executed by the CPU 201 as well as various information (such as spot management information, search log information, news information and associated information) used when the CPU 201 executes the various programs.

The input unit 205 is used when a manager on each server inputs various instructions to each server. The communication unit 206 performs communication with each terminal (the mobile terminal 150 and the information terminal 160) through the Internet 170.

3. Hardware Configuration of Each Terminal

Next, a hardware configuration of each terminal (the mobile terminal 150 and the information terminal 160) will be described. FIG. 3 is a diagram illustrating the hardware configuration of each terminal.

As illustrated in FIG. 3, each terminal includes a CPU 301, a ROM 302, a RAM 303, and a storage unit 304. Each terminal further includes an input unit 305, a display unit 306 and a communication unit 307. Each unit of each terminal is mutually connected through a bus 308.

The CPU 301 is a computer executing various programs (such as a browser) stored in the storage unit 304. The ROM 302 is a non-volatile memory. The ROM 302 stores various programs and data required for the CPU 301 to execute the various programs stored in the storage unit 304. Specifically, the ROM stores a boot program such as the BIOS and EFI.

The RAM 303 is a main storage such as the DRAM and SRAM. The RAM 303 functions as a work area developed when the CPU 301 executes the various programs stored in the storage unit 304.

The storage unit 304 stores the various programs executed by the CPU 301 as well as various information used when the CPU 301 executes the various programs.

The input unit 305 is used when a user of each terminal inputs various instructions to each terminal. The display unit 306 displays a news article that each terminal acquires by connecting to the Internet 170, for example. The communication unit 307 performs communication with each server (the spot information management server 110, the search server 120, the news providing server 130, and the detailed information providing server 140) through the Internet 170.

4. Description of Information Stored in Each DB

Next, there will be described details of the information (the spot management information, the search log information, the news information, and the associated information) stored in the DB on each server (the spot management DB 112, the search log DB 122, the news information DB 132, and the associated information DB 143), respectively.

(1) Spot Management Information

First, spot management information 400 stored in the spot management DB 112 on the site information management server 110 will be described. FIG. 4 is a table illustrating an example of the spot management information 400.

As illustrated in FIG. 4, the spot management information 400 includes a "facility name or store name", a "URL", an "address", a "phone number", "latitude/longitude", a "business category", "business hours", a "menu", a "reputation", "image data", a "map guide", and the like as information items.

An official name of a spot such as a facility or store is stored under the "facility name or store name". When the store is a chain store, for example, an official name including a branch name such as "oo Akasaka Store" is stored. A URL (Uniform Resource Locator) used to access a website provided by the spot is stored under the "URL". Stored under the "address", "phone number" and "latitude/longitude" are an address indicating a location of the spot, a phone number being contact information of the spot, and latitude/longitude indicating position information of the spot, respectively.

A business category of a service provided at the spot (such as a liquor store and a restaurant) is stored under the "business category". Hours for which the service is provided at the spot are stored under the "business hours". When the business category of the service provided at the spot is the "restaurant", a menu provided at the spot is stored under the "menu". A word-of-mouth reputation of a user using the service provided at the spot is stored under the "reputation". Photo data illustrating the appearance of the spot and/or the service provided thereat is stored under the "image data". A method of accessing the spot from the nearest station or the like is stored under the "map guide".

The spot management information 400 includes the detailed information as described above on each of a plurality of spots. Note that the detailed information on the spot included in the spot management information 400 can be acquired by accessing the URL of the website provided by the spot.

(2) Search Log Information

Next, search log information 500 stored in the search log DB 122 will be described. FIG. 5 is a table illustrating an example of the search log information 500.

As illustrated in FIG. 5, the search log information 500 includes a "search query", a "hit count", a "URL", and a "click count" as information items.

Stored under the "search query" is an expression input by the user of each terminal to search for information by using the search server 120. FIG. 5 illustrates an example where "AA BBB" is input as the search query by the user in order to search for information associated with expressions "AA" and "BBB".

Stored under the "hit count" is the number of search results obtained as a result of the search performed on the Internet 170 on the basis of the search query. A URL of a link destination (link destination information) used to access each of the search results is stored under the "URL".

Stored under the "click count" is the number of times the user actually clicks any of the search results and accesses the URL of the link destination.

The search log information 500 includes log information of a web search performed on the Internet 170 for each search query, as described above. One can therefore know a piece of detailed information desired by many people by referring to the search log information 500.

(3) News Information

Next, news information 600 stored in the news information DB 132 will be described. FIG. 6 is a diagram illustrating an example of the news information 600.

As illustrated in FIG. 6, the news information 600 includes a header 610 and a body 620. The header 610 includes a news information ID of the news information 600, a distribution source of a news article, distribution date and time of the news article, and a URL of a link destination used to access the news information 600.

The body 620 includes the news article. FIG. 6 illustrates an example where the news information pertains to a news article stating that a commodity name "□□□□" is released, the news article including an expression identical to the expression "AA" forming the search query as well as an expression identical to an expression "CCC" forming the search query.

(4) Associated Information

Next, associated information 700 stored in the associated information DB 143 will be described. FIG. 7 is a table illustrating an example of the associated information 700.

As illustrated in FIG. 7, the associated information 700 includes a "news article", a "news information ID", a "search query", and "detailed information" as information items.

The news article of the news information (such as the body 620 of the news information 600) acquired from the news providing server 130 is included under the "news article". An identifier (such as "news X") specifying the news information acquired from the news providing server 130 is stored under the "news information ID".

When an expression identical to an expression forming a search query is included among expressions included the news article in the body 620 of the news information acquired from the news providing server 130, the search query is stored under the "search query". The expressions "AA" and "CCC" identical to the expressions forming the search query are included in the news article in the body 620 of the news information 600 (when the news information ID is "news X"). As a result, "AA CCC" is stored under the "search query" in association with the news article of the news information 600.

Stored under the "detailed information" is detailed information on a spot specified by a URL of a search result, a link destination of which is most frequently accessed actually by a user, among search results obtained when the search server 120 performs a search by using the search query stored under the "search query". FIG. 7 illustrates an example where, among a plurality of search results obtained by performing a search with the search query "AA CCC", a spot specified by a URL of a link destination of a search result most frequently accessed by a user has a store name "ααα".

Likewise, FIG. 7 illustrates an example where, among a plurality of search results obtained by performing a search with a search query "DDDD EEE", a spot specified by a URL of a link destination of a search result most frequently accessed by a user has a store name "ββββ".

On the detailed information providing server 140, the search query included in the news article and the detailed information on the search result obtained with the search query and most frequently accessed by a user are stored in association with each other as the associated information 700. That is, the news article and the detailed information (detailed information on the spot) desired by the user viewing the news article are stored in association with each other.

5. Functional Configuration of News Providing Server

Figure 8:
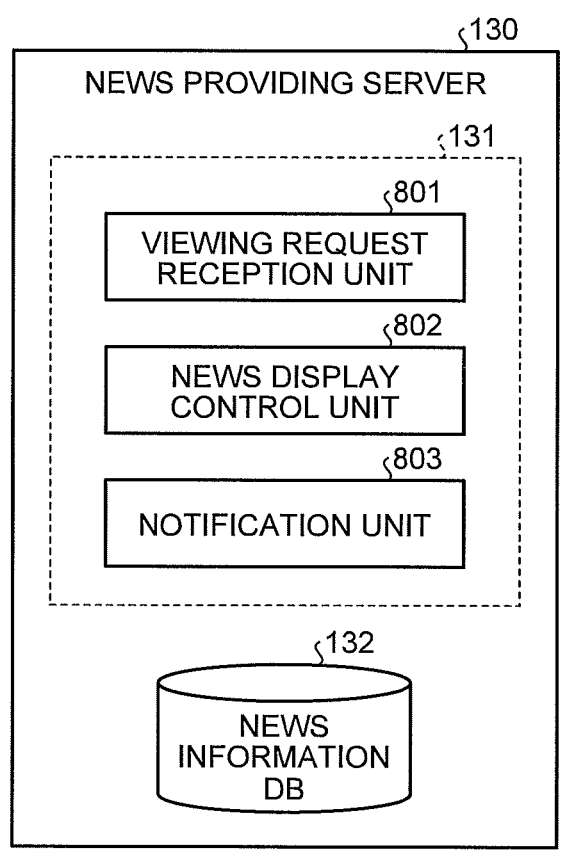
FIG. 8 is a diagram illustrating a functional configuration of a news providing server.

Next, a function implemented on the news providing server 130 by executing the news providing program 131 will be described. FIG. 8 is a diagram illustrating a functional configuration of the news providing server 130.

As illustrated in FIG. 8, the news providing server 130 includes a viewing request reception unit 801, a news display control unit 802, and a notification unit 803. The viewing request reception unit 801 receives a request to view the news article from each terminal.

When an instruction to display the news article is received from the user on each terminal while accessing a news site through a browser function, for example, a viewing request including a URL of a link destination used to access the news article is transmitted to the news providing server 130. The viewing request reception unit 801 then receives the viewing request.

The news display control unit 802 reads, from the news information DB 132, the news article specified by the URL included in the viewing request that is received on the viewing request reception unit 801 and transmits the article to each terminal. The user of each terminal can thus view thereon the news article for which he transmits the display instruction.

Every time news information is newly stored in the news information DB 132, the notification unit 803 notifies the detailed information providing server 140 that the news information is newly stored.

6. Functional Configuration of Detailed Information Providing Server

Figure 9:
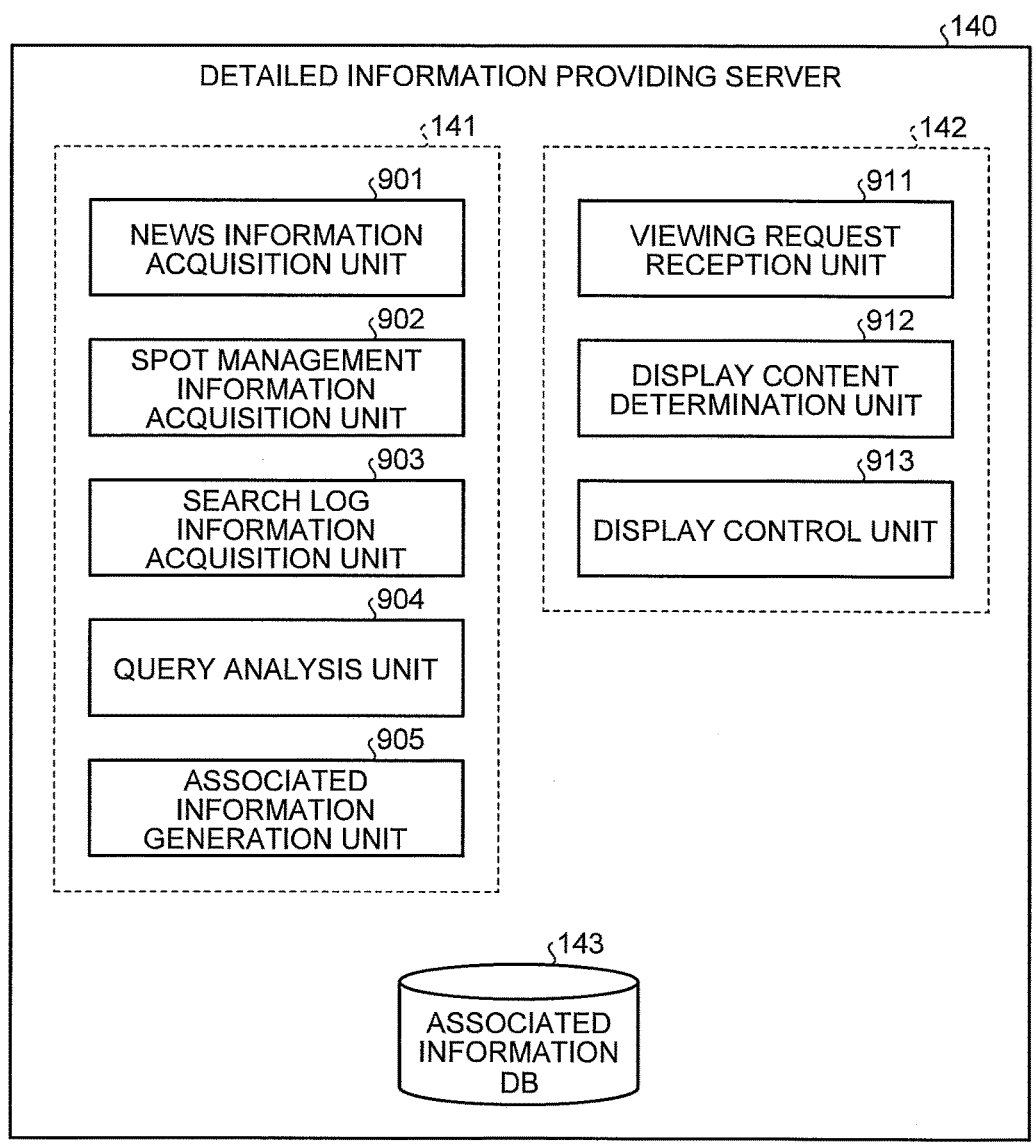
FIG. 9 is a diagram illustrating a functional configuration of a detailed information providing server.

Next, a function implemented on the detailed information providing server 140 by executing the news analysis program 141 and the detailed information providing program 142 will be described. FIG. 9 is a diagram illustrating a functional configuration of the detailed information providing server 140.

As illustrated in FIG. 9, the detailed information providing server 140 includes a news information acquisition unit 901, a spot management information acquisition unit 902, a search log information acquisition unit 903, a query analysis unit 904, and an associated information generation unit 905. The detailed information providing server 140 further includes a viewing request reception unit 911, a display content determination unit 912, and a display control unit 913.

Upon receiving the notification from the notification unit 803 of the news providing server 130 that the news information is newly stored, the news information acquisition unit 901 transmits a request to acquire the newly stored news information. Accordingly, the news providing server 130 transmits the newly stored news information to the detailed information providing server 140 so that the news information acquisition unit 901 acquires the news information. The news information acquisition unit 901 also notifies the spot management information acquisition unit 902 and the search log information acquisition unit 903 that the news information is acquired.

Receiving the notification from the news information acquisition unit 901 that the news information is newly acquired, the spot management information acquisition unit 902 transmits a request to acquire the spot management information 400 to the spot information management server 110. The spot management information acquisition unit 110 acquires the spot management information 400 transmitted from the spot information management server 110 receiving the acquisition request.

Receiving the notification from the news information acquisition unit 901 that the news information is newly acquired, the search log information acquisition unit 903 transmits a request to acquire the search log information 500 to the search server 120. The search log information acquisition unit acquires the search log information 500 transmitted from the search server 120 receiving the acquisition request.

The query analysis unit 904 analyzes a news article included in the news information that is acquired by the news information acquisition unit 901. Specifically, the query analysis unit analyzes whether or not the news article includes an expression (keyword) identical to an expression forming each search query included in the search log information 500 acquired by the search log information acquisition unit 903. When determining that any search query is included in the news article, the query analysis unit 904 searches the search log information 500 and identifies a URL associated with the search query. The query analysis unit also extracts, from the spot management information 400, detailed information (such as the store name, address, and phone number) of a spot specified by the URL being identified.

The associated information generation unit 905 stores the detailed information on the spot specified by the identified URL and the news article to be analyzed in association with each other into the associated information 700. At this time, the associated information generation unit 905 also stores a news information ID of the news information including the news article to be analyzed and the search query included in the news article to be analyzed in association with the news article into the associated information 700.

The viewing request reception unit 911 receives the viewing request transmitted from each terminal to the news providing server 130. The viewing request reception unit 911 extracts the URL of the link destination included in the viewing request received, identifies the news information ID of the news information including the news article that is specified by the extracted URL, and notifies the display content determination unit 912 of the ID.

The display content determination unit 912 uses the news information ID notified from the viewing request reception unit 911 to search the associated information 700 stored in the associated information DB 143. Then, detailed information associated with the notified news information ID is extracted. The store name, address, and phone number are stored as the detailed information in the associated information 700, whereby the display content determination unit 912 determines the store name, address, and phone number associated with the notified news information ID to be the display content displayed on the terminal.

The display control unit 913 transmits the detailed information determined to be the display content by the display content determination unit 912 to a terminal (such as the mobile terminal 150) making the viewing request. As a result, the detailed information transmitted from the detailed information providing server 140 in addition to the news article for which the user makes the display instruction is displayed on the mobile terminal 150.

Figure 10:
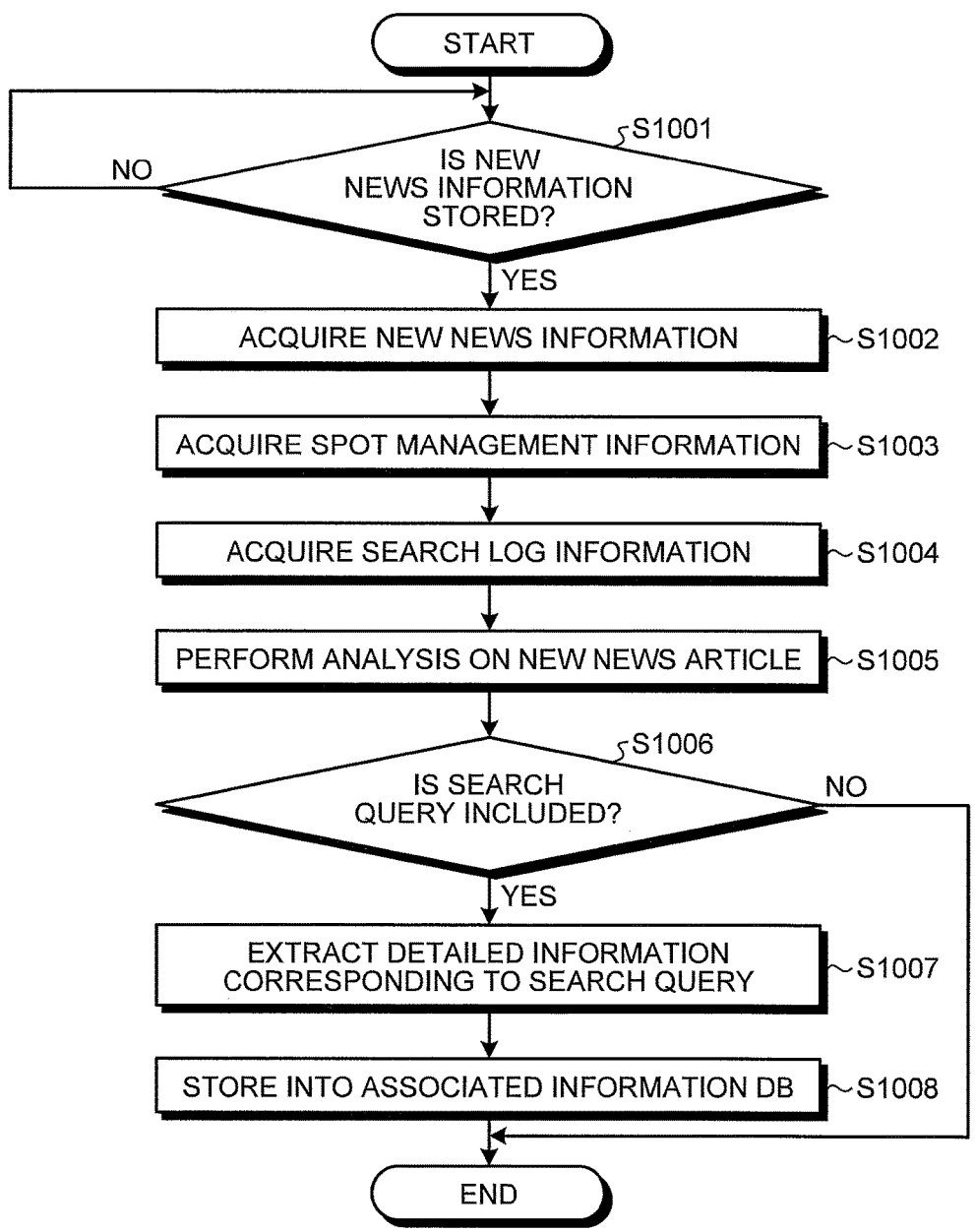
FIG. 10 is a flowchart illustrating a flow of associated information generation processing performed by the detailed information providing server.

7. Flow of Associated Information Generation Processing Performed by Detailed Information Providing Server Next, there will be described the flow of associated information generation processing in which the detailed information providing server 140 generates the associated information 700. FIG. 10 is a flowchart illustrating the flow of the associated information generation processing performed by the detailed information providing server 140.

In step S1001, the news information acquisition unit 901 determines whether or not a new piece of news information is stored in the news information DB 132 of the news providing server 130. Specifically, the news information acquisition unit determines whether or not a notification stating that the news information is newly stored is received from the notification unit 803 of the news providing server 130.

When determining in step S1001 that the notification stating the news information is newly stored is not received, the news information acquisition unit stands by until it receives the notification stating that the news information is newly stored. On the other hand, the news information acquisition unit proceeds to step S1002 when determining in step S1001 that the news information is newly stored.

In step S1002, the news information acquisition unit 901 acquires the newly stored news information. Specifically, the news information acquisition unit transmits a request to acquire the newly stored news information to the news providing server 130 and acquires the newly stored news information when it is transmitted from the news providing server 130.

Likewise, in step S1003, the spot management information acquisition unit 902 acquires the spot management information 400 from the spot information management server 110. In step S1004, the search log information acquisition unit 903 acquires the search log information 500 from the search server 120.

In step S1005, the query analysis unit 904 performs analysis on a news article included in the news information that is acquired in step S1002. Specifically, the query analysis unit searches the news article included in the acquired news information for each search query included in the search log information 500 acquired in step S1004.

In step S1006, the query analysis unit 904 determines whether or not the search query is included in the news article being analyzed as a result of the search performed in step S1005. When it is determined in step S1006 that the search query is not included in the news article being analyzed, the server ends the associated information generation processing for the news article being analyzed.

On the other hand, the processing proceeds to step S1007 when it is determined in step S1006 that the search query is included in the news article being analyzed. In step S1007, the query analysis unit 904 identifies a URL associated with the search query included in the news article on the basis of the search log information 500. Moreover, the query analysis unit 904 searches the spot management information 400 and extracts detailed information on a spot specified by the URL being identified.

In step S1008, the associated information generation unit 905 lists the detailed information extracted in step S1007 in association with the news article acquired in step S1002 into the associated information 700. The associated information generation unit 905 lists into the associated information 700 a news information ID of the news information including the news article acquired in step S1002 and the search query determined to be included in the news article being analyzed in step S1006. Moreover, the associated information generation unit 905 stores the associated information 700 into the associated information DB 143.

Figure 11:
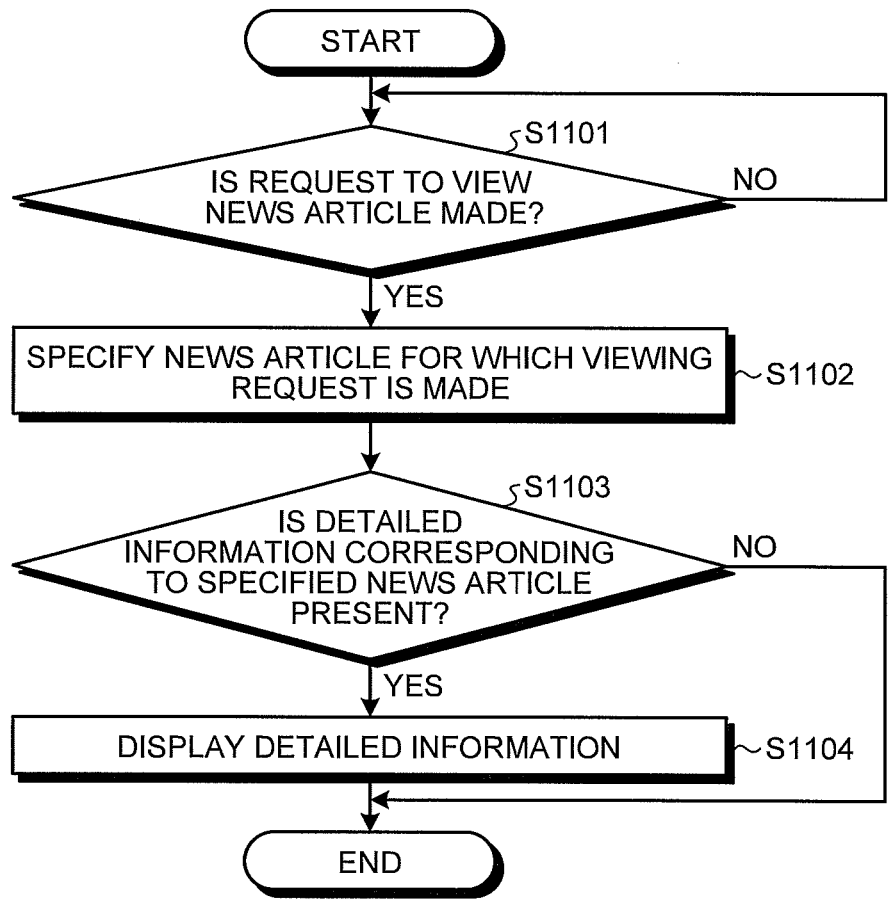
FIG. 11 is a flowchart illustrating a flow of detailed information provision processing performed by the detailed information providing server.

8. Flow of Detailed Information Provision Processing Performed by Detailed Information Providing Server Next, the flow of detailed information provision processing performed by the detailed information providing server 140 will be described. FIG. 11 is a flowchart illustrating the flow of the detailed information provision processing performed by the detailed information providing server 140.

In step S1101, the viewing request reception unit 911 determines whether or not a request to view a news article is received from each terminal. When determining in step S1101 that the request to view the news article is not received, the viewing request reception unit stands by until it receives the request to view the news article.

On the other hand, the processing proceeds to step S1102 when the viewing request reception unit 911 determines in step S1101 that the request to view the news article is received.

In step S1102, the display content determination unit 912 specifies the news article on the basis of the viewing request that is determined to be received by the viewing request reception unit 911. Specifically, the display content determination unit identifies a news information ID of news information that has a URL included in the viewing request as a link destination.

In step S1103, the display content determination unit 912 determines presence/absence of detailed information corresponding to the specified news article. Specifically, the display content determination unit searches the associated information 700 on the basis of the news information ID identified in step S1102, and determines the presence/absence of the detailed information associated with the news information ID identified in step S1102. The server ends the detailed information provision processing when the detailed information is determined to be absent in step S1103.

On the other hand, the processing proceeds to step S1104 when the detailed information is determined to be present in step S1103. In step S1104, the display content determination unit 912 determines the detailed information associated with the news information ID identified in step S1102 to be display content displayed on the terminal. Moreover, the display control unit 913 performs control to display, on the terminal, the detailed information determined as the display content to be displayed on the terminal.

9. Display Example

Figure 12A:
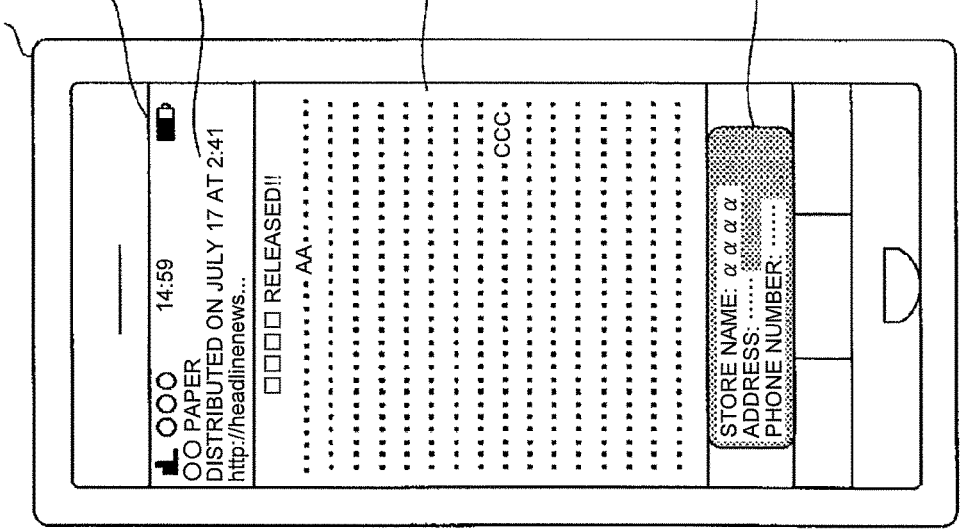
FIGS. 12A and 12B are diagrams each illustrating a display example of a display screen on a mobile terminal.
Figure 12B:
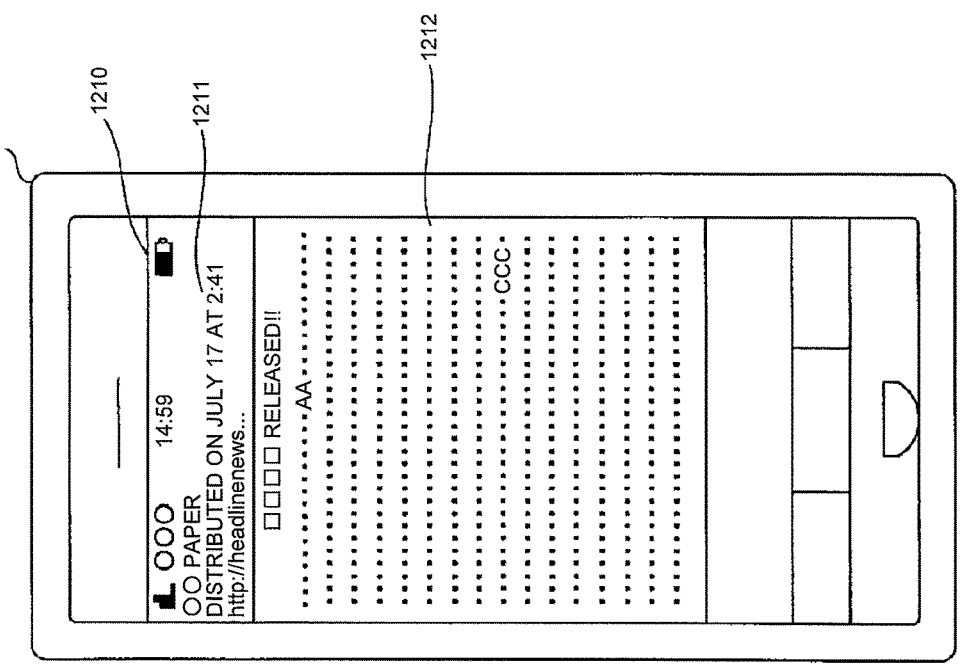

Next, there will be described a display example of a display screen on the mobile terminal 150. FIGS. 12A and 12B are diagrams each illustrating the display example of the display screen on the mobile terminal 150. FIG. 12A illustrates a case where the mobile terminal 150 is connected to the Internet 170, and an instruction to display a specific news article is input to the terminal after the terminal accesses a news site.

As illustrated in FIG. 12A, a header information display area 1211 on a display screen 1210 displays information included in the header 610 of the news information 600. FIG. 12A illustrates the example where a distribution source, distribution date and time, and a URL of the news article are displayed. An article display area 1212 on the display screen 1210 displays the news article included in the body 620 of the news information 600. FIG. 12A illustrates the example where the news article with the news information ID "news X" is displayed.

On the other hand, FIG. 12B illustrates a case where detailed information on a spot is displayed upon input of the instruction to display the specific news article. According to the associated information 700, the news information with the news information ID "news X" is associated with a store name "ααα α", an address "• • • •", and a phone number "•• • • • • •" as the detailed information. A detailed information display area 1213 thus displays the store name "ααα α", the address "• • • •", and the phone number "•• • • • • •" as the detailed information on the spot.

10. Summary

It is apparent from the aforementioned description that the detailed information providing server 140 is configured to:
Connect to the spot information management server 110, the search server 120, and the news providing server 130, acquire the spot management information 400, the search log information 500 and the news information 600, and generate the associated information 700 in which these pieces of information are associated;
Identify the URL associated with the search query included in the search log information 500 on the basis of the search log information 500 when the search query is included in the news article of the news information 600, and generate the associated information 700 by extracting from the spot management information 400 the detailed information on the spot specified by the identified URL; and
Extract the detailed information associated with the news article from the associated information 700 and perform control to display the detailed information along with the news article, when displaying the news article on the terminal.

A user can therefore obtain the detailed information on the spot when the news article is displayed on the terminal. That is, the detailed information desired by the user viewing the news article can be automatically provided to the user. As a result, the convenience for the user in acquiring information can be improved.

Second Embodiment

It has been described in the first embodiment that one search query is included in one news article. In a second embodiment, on the other hand, there will be described a case where a plurality of search queries is included in one news article. In the case where the plurality of search queries is included in one news article, detailed information on each spot can be displayed, but a user can possibly be annoyed when the detailed information on a plurality of spots is displayed. Now, the second embodiment is adapted to extract a search query having the highest degree of association with the news article when the plurality of search queries is included in one news article. As a result, only one piece of detailed information on the spot can be displayed even when the plurality of search queries is included. The second embodiment will be described below. Note that the second embodiment will be described while focusing on what is different from the first embodiment.

1. Description of Information Stored in Each DB

First, there will be described details of news information and associated information among information stored in a DB of each server (a spot management DB 112, a search log DB 122, a news information DB 132, and an associated information DB 143).

(1) News Information

News information 1300 stored in the news information DB 132 will be described. FIG. 13 is a diagram illustrating an example of the news information 1300.

As illustrated in FIG. 13, expressions "AA", "BBB" and "CCC" forming a search query are included in the news information 1300 (when a news information ID is "news Z"). The news information 1300 includes two types of search queries since the search log information 500 includes "AA BBB" and "AA CCC" as search queries.

(2) Associated Information

Next, associated information 1400 stored in the associated information DB 143 will be described. FIG. 14 is a table illustrating an example of the associated information 1400.

As described with reference to FIG. 13, the two types of search queries "AA CCC" and "AA BBB" are included in the news article when the news information 1300 has the news information ID "news Z". Accordingly, as illustrated in FIG. 14, the two types of search queries "AA CCC" and "AA BBB" are associated with the news information ID "news Z" in the associated information 1400.

Here, according to the search log information 500, the search query "AA BBB" is associated with "URL_III" as a URL. The search query "AA CCC" is associated with "URL_I" as a URL. Moreover, according to the spot management information 400, the "URL_I" corresponds to a store with the store name "αααα", and the "URL_III" corresponds to a store with a store name "γγγγ".

The search query "AA CCC" is therefore associated with detailed information on a spot with the store name "αααα" as the detailed information of the news information ID "news Z". The search query "AA BBB" is associated with detailed information on a spot with the store name "γγγγ".

Note that in the present embodiment, the associated information 1400 includes a "score" as an information item. The score in this case is a parameter indicating the degree of association between the search query and the news article. FIG. 14 illustrates an example where the degree of association between the search query "AA CCC" and the news article of the news information 1300 with the news information ID "news Z" is "25". The degree of association between the search query "AA BBB" and the news article of the news information 1300 with the news information ID "news Z" is "41". That is, the news article in the news information 1300 with the news information ID "news Z" is more relevant to the search query "AA BBB" than to the search query "AA CCC".

The score in the associated information 1400 is determined on the basis of the "click count" in the search log information 500, for example. Specifically, the score is determined on the basis of the maximum click count stored in association with each search query in the search log information 500. According to the search log information 500, the maximum click count (1831 times) for the search query "AA BBB" is greater than the maximum click count (1521 times) for the search query "AA CCC". The score in the associated information 1400 is thus higher for the search query "AA BBB".

However, the score in the associated information 1400 is determined on the basis of not only the maximum click count. It may be configured, for example, to calculate a parameter based on the maximum click count and calculate a score corresponding to the parameter. Alternatively, the score may be determined on the basis of the number of times each search query included in the news article appears without using the maximum click count.

Figure 15:
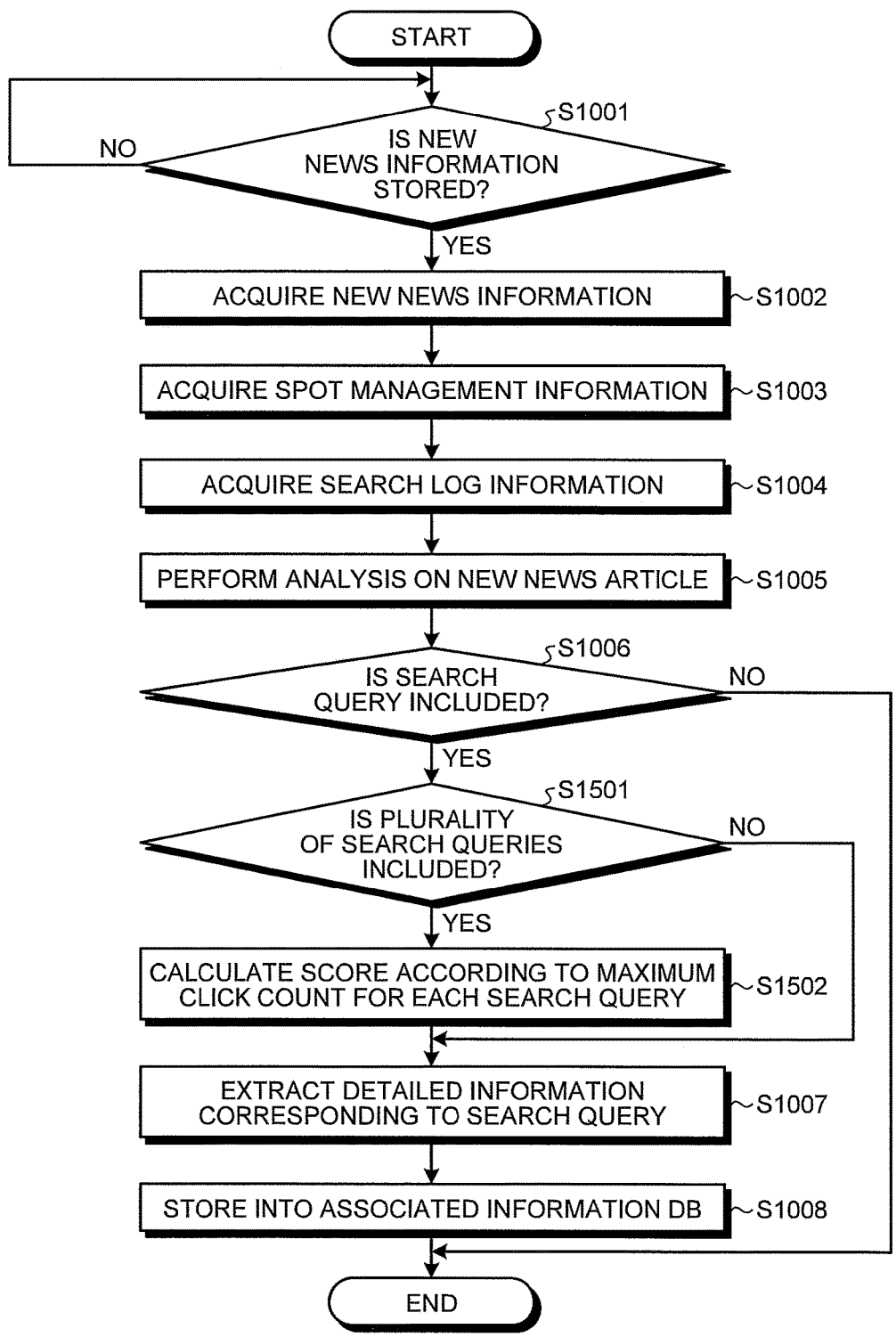
FIG. 15 is a flowchart illustrating a flow of associated information generation processing performed by a detailed information providing server.

2. Flow of Associated Information Generation Processing Performed by Detailed Information Providing Server Next, there will be described the flow of associated information generation processing in which the detailed information providing server 140 generates the associated information 1400. FIG. 15 is a flowchart illustrating the flow of the associated information generation processing performed by the detailed information providing server 140. Note that for each step in the flowchart illustrated in FIG. 15, a step performing the same processing as that of the step in the flowchart illustrated in FIG. 10 will be assigned the same reference numeral to omit description.

FIG. 15 is different from FIG. 10 in that steps S1501 and S1502 are added. The processing proceeds to step S1501 when the query analysis unit 904 determines that the search query is included in the news article being analyzed.

In step S1501, the query analysis unit 904 determines whether or not a plurality of types of search queries is included in the news article being analyzed. The processing proceeds to step S1007 when it is determined in step S1501 that only one search query is included.

On the other hand, the processing proceeds to step S1502 when it is determined in step S1501 that the plurality of search queries is included. In step S1502, the query analysis unit 904 refers to the search log information 500, calculates a score corresponding to the maximum click count for each search query, and stores the score under the "score" in the associated information 1400.

Therefore, in step S1007, the detailed information associated with the search query with a large score is extracted from the associated information 1400.

3. Summary

It is apparent from the aforementioned description that the detailed information providing server 140 is configured to:

Connect to the spot information management server 110, the search server 120, and the news providing server 130, acquire the spot management information 400, the search log information 500 and the news information

1300, and generate the associated information 1400 in which these pieces of information are associated;

Identify the URL associated with the search query included in the search log information 500 on the basis of the search log information 500 when the search query is included in the news article of the news information 1300, and refer to the search log information 500 to calculate the score indicating the degree of association between each search query and the news article, when the plurality of search queries included in the search log information 500 is included in the news article of the news information 1300;

Extract the detailed information on the spot specified by the identified URL from the spot management information 400 and list the information along with the calculated score into the associated information 700; and Extract the detailed information associated with the news article and having a high score from the associated information 1400 and perform control to display the detailed information along with the news article, when displaying the news article on the terminal.

A user can therefore obtain the detailed information on the spot when the news article is displayed on the terminal. That is, the detailed information desired by the user viewing the news article can be automatically provided to the user. As a result, the convenience for the user in acquiring information can be improved.

Third Embodiment

The first and second embodiments are configured to generate the associated information on the basis of the search query included in the news article so that a user can easily obtain the detailed information even when the news article does not include the detailed information. The embodiments are not limited to such case, however. Some news articles include a portion of the detailed information, for example. Such news articles may be configured to use the portion of the detailed information and provide another piece of detailed information.

Specifically, when the news article includes a store name but does not include an address, a phone number and a URL, it may be configured to extract the store name by analyzing the news article and acquire the other detailed information (the address, phone number and URL) from the spot management information. The third embodiment will be described below.

1. Description of News Information

First, there will be described news information 1600 including a news article to be analyzed by a detailed information providing server 140 according to the present embodiment. FIG. 16 is a diagram illustrating an example of the news information 1600.

As illustrated in FIG. 16, expressions "AA" and "CCC" forming a search query are included in a news article of the news information 1600 (when a news information ID is "news Z"). Moreover, the news article of the news information 1600 includes a store name "αααα" preceding a station name "Tokyo station" written in parentheses.

Note that while only one store name is included in the news article in the example illustrated in FIG. 16, the store name is not limited to one and the news article may include a plurality of store names as well. Moreover, while the store name appears only once in the news article in the example illustrated in FIG. 16, the same store name may appear a plurality of times within the news article as well.

2. Functional Configuration of Detailed Information Providing Server

Figure 17:
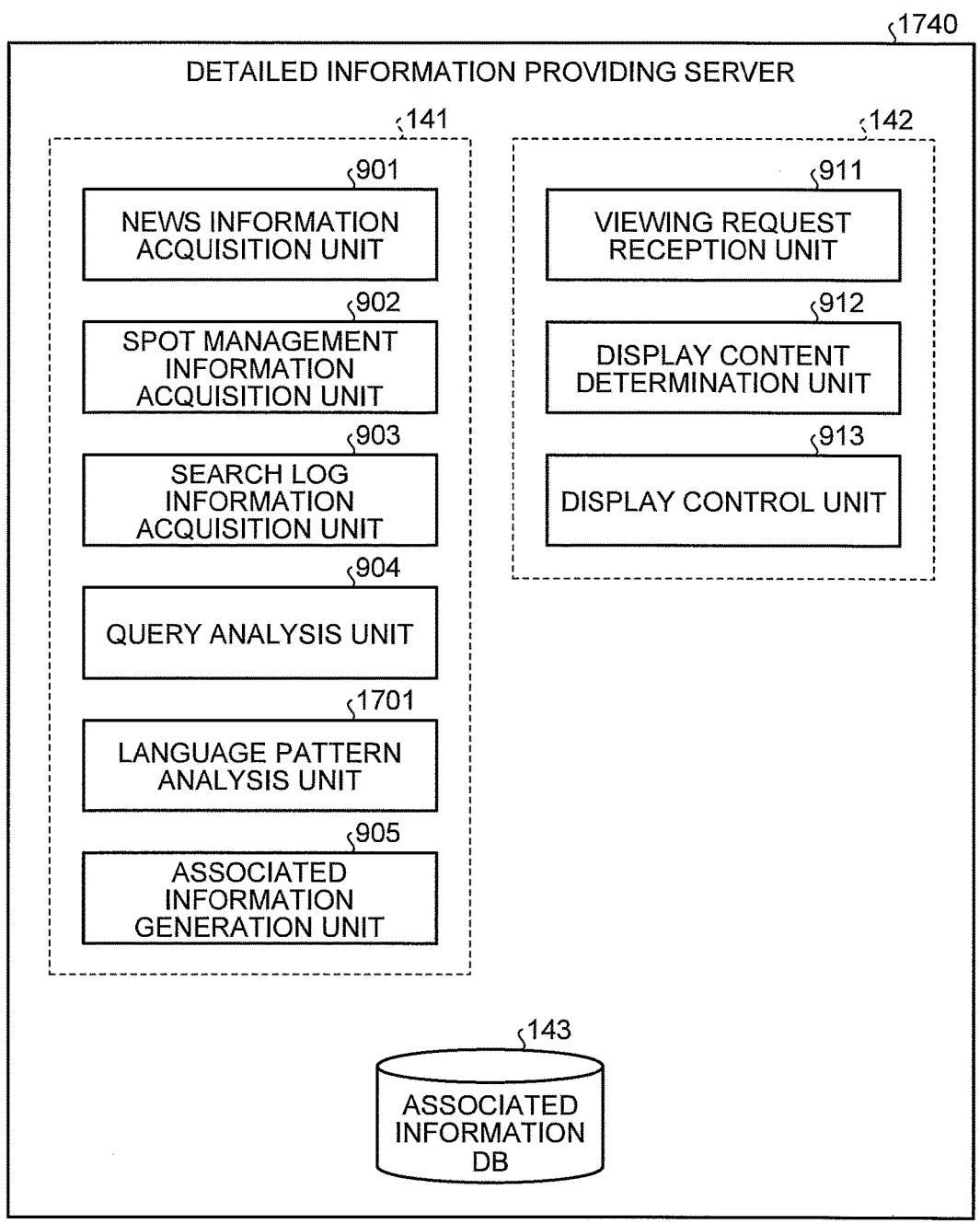
FIG. 17 is a diagram illustrating a functional configuration of the detailed information providing server.

Next, a functional configuration of a detailed information providing server 1740 according to the present embodiment will be described. FIG. 17 is a diagram illustrating the functional configuration of the detailed information providing server 1740. Note that a component identical to that of the detailed information providing server 140 described with reference to FIG. 9 in the first embodiment will be assigned the same reference numeral to omit description of such component.

FIG. 17 is different from FIG. 9 in that a language pattern analysis unit 1701 is included. The language pattern analysis unit 1701 analyzes a language pattern of a news article included in the news information that is acquired by a news information acquisition unit 901. Specifically, the language pattern analysis unit extracts from a news article an expression estimated to indicate information on a spot (hereinafter referred to as a spot candidate) and narrows down extracted spot candidates to one spot candidate for which detailed information is to be displayed. Then, the detailed information corresponding to the one narrowed-down spot candidate is extracted on the basis of spot management information 400 and stored in association with the news article into associated information.

The spot candidate is extracted from the news article by, for example, extracting description matching a description pattern of information on the spot.

In the description saying "Do . . . at oo" as the description pattern of the information on the spot, for example, an expression corresponding to "oo" often represents the information on the spot. An expression in brackets such as "[oo]" often represents the information on the spot as well. Moreover, when information indicating a location is included in parentheses such as "oo (Tokyo station)", an expression immediately preceding the parentheses often represents the information on the spot.

The information on the spot has the description pattern in the news article as described above, so that the spot candidate can be extracted from the news article by analyzing the news article on the basis of a description pattern defined in advance.

Moreover, when the plurality of spot candidates is narrowed down to one spot candidate, it may be configured to determine the number of points for each description pattern defined in advance and give a different number of points depending on which description pattern the extraction of the spot candidate is based upon. It may then be configured to select the spot candidate to which the highest number of points is given and generate the associated information. In this case, it is assumed that a high number of points is set to the description pattern with which information on a spot is highly likely described in the news article.

The number of points can be set such that 0.6 points are set to the description saying "Do . . . at oo", 0.7 points are set to the description "[oo]", and 0.9 points are set to the description "oo ( )", for example.

When the spot candidate is extracted on the basis of the same description pattern, it may be configured to select a spot candidate appearing many times in the news article and generate the associated information.

Note that when the selected spot candidate is a store name, another detailed information (such as the address, phone number and URL) associated with the store name is extracted from the spot management information 400 so that the extracted other detailed information is added to the associated information in association with the news article.

When the selected spot candidate is the URL, another detailed information (such as the store name, address, and phone number) associated with the URL is extracted from the spot management information 400 so that the extracted other detailed information is added to the associated information in association with the news article.

3. Description of Associated Information

Next, there will be described associated information 1800 that is generated by the detailed information providing server 1740 according to the present embodiment by analyzing the news information 1600 illustrated in FIG. 16. FIG. 18 is a table illustrating an example of the associated information 1800.

The news information 1600 with the news information ID "news Z" includes "AA" and "CCC" as expressions forming a search query, so that a query analysis unit 904 extracts "AA CCC" as a search query. Then, the extracted search query is stored in association with the news information ID "news Z" into the associated information 1800. The query analysis unit 904 further stores detailed information on a spot specified by a URL associated with the extracted search query into the associated information 1800 in association with the news information ID "news Z".

Moreover, the description "αααα (Tokyo station)" is included in the news information 1600 so that the language pattern analysis unit 1701 extracts "αααα" as the spot candidate. The extracted spot candidate is then stored in association with the news information ID "news Z" into the associated information 1800. Moreover, the language pattern analysis unit 1701 extracts another detailed information associated with the spot candidate "αααα" from the spot management information 400 and stores the information in association with the news information ID "news Z" into the associated information 1800.

The associated information 1800 for the news information with the news information ID "news Z" can be generated as a result.

Figure 19:
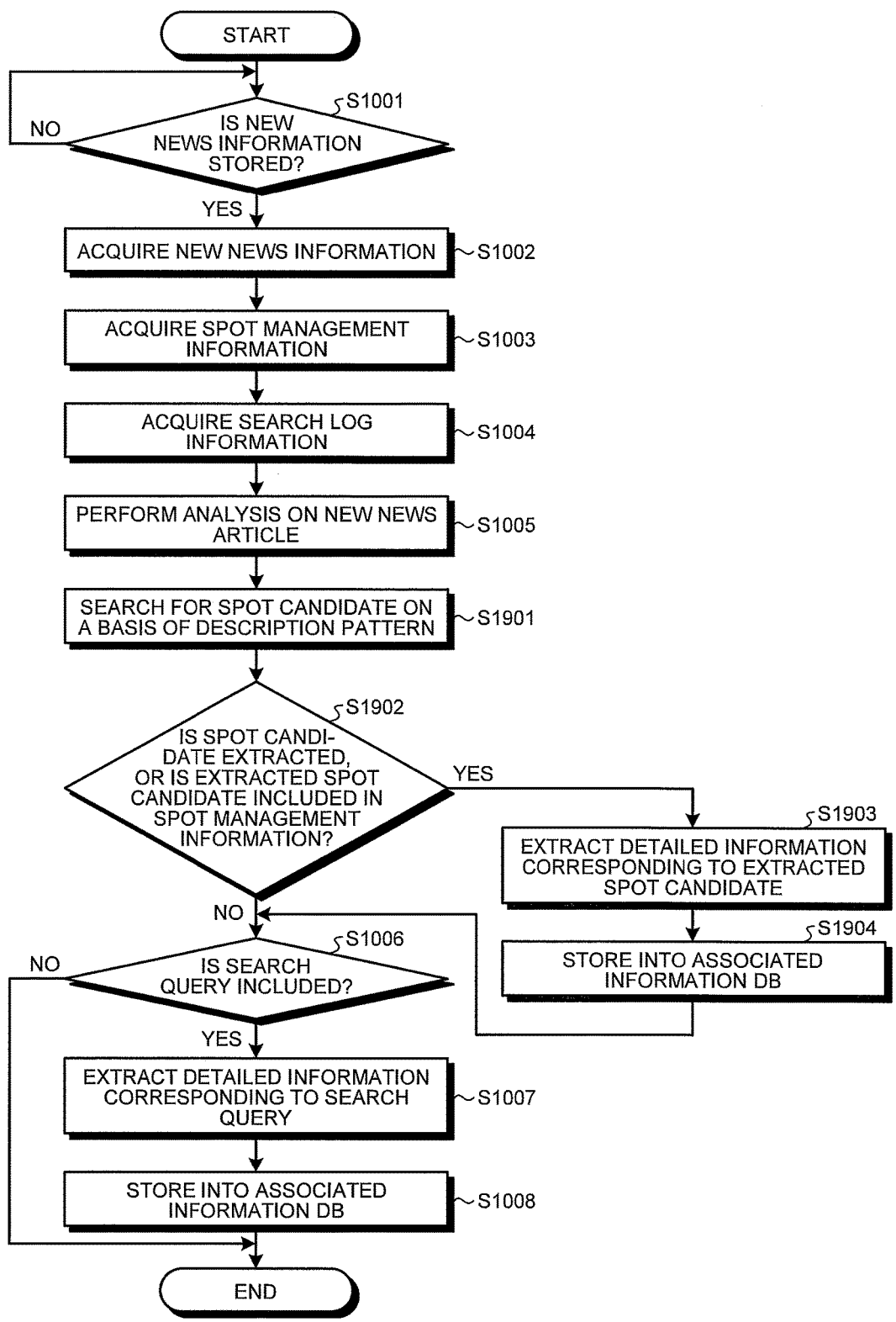
FIG. 19 is a flowchart illustrating a flow of associated information generation processing performed by the detailed information providing server.

4. Flow of Associated Information Generation Processing Performed by Detailed Information Providing Server Next, there will be described the flow of associated information generation processing in which the detailed information providing server 1740 generates the associated information 1800. FIG. 19 is a flowchart illustrating the flow of the associated information generation processing performed by the detailed information providing server 1740. Note that among steps of the associated information generation processing illustrated in FIG. 19, a step identical to that in the associated information generation processing described with reference to FIG. 10 in the first embodiment will be assigned the same reference numeral to omit description of such step.

FIG. 19 is different from FIG. 10 in that steps S1901 to S1904 are added and each of steps S1006 to S1008 is executed after each of steps S1901 and S1902.

In step S1901, the language pattern analysis unit 1701 searches for a spot candidate on a basis of the description pattern of information on the spot in the news article that is newly acquired in step S1002.

In step S1902, the language pattern analysis unit 1701 determines whether or not the spot candidate is successfully extracted from the news article that is newly acquired in step S1002. When the spot candidate is successfully extracted, the language pattern analysis unit determines whether or not the extracted spot candidate is included in the spot management information 400 acquired in step S1003.

On the other hand, the processing proceeds to step S1006 when the spot candidate is determined to not be extracted in step S1902. The processing proceeds to step S1006 when it is determined that the spot candidate is successfully extracted but information matching the extracted spot candidate is not included in the spot management information 400. Note that each of steps S1006 to S1008 is identical to each of steps S1006 to S1008 in FIG. 10 and thus will not be described.

On the other hand, the processing proceeds to step S1903 when it is determined in step S1902 that the spot candidate is successfully extracted and the information matching the extracted spot candidate is included in the spot management information 400.

In step S1903, the language pattern analysis unit 1701 extracts another detailed information associated with the extracted spot candidate from the spot management information 400. Moreover, an associated information generation unit 905 adds to the associated information 1800 the spot candidate and the other detailed information extracted from the spot management information 400 in association with the spot candidate in the news article being analyzed.

In step S1904, the associated information generation unit 905 further stores the associated information 1800 into an associated information DB 143.

The detailed information providing server 1740 according to the present embodiment includes the language pattern analysis unit 1701 and analyzes the news article on the basis of the description pattern of the information on the spot to generate the associated information 1800, as described above. As a result, when the news article includes a portion of the detailed information, the detailed information providing server 1740 uses the portion of the detailed information to be able to acquire the other detailed information.

Figure 20:
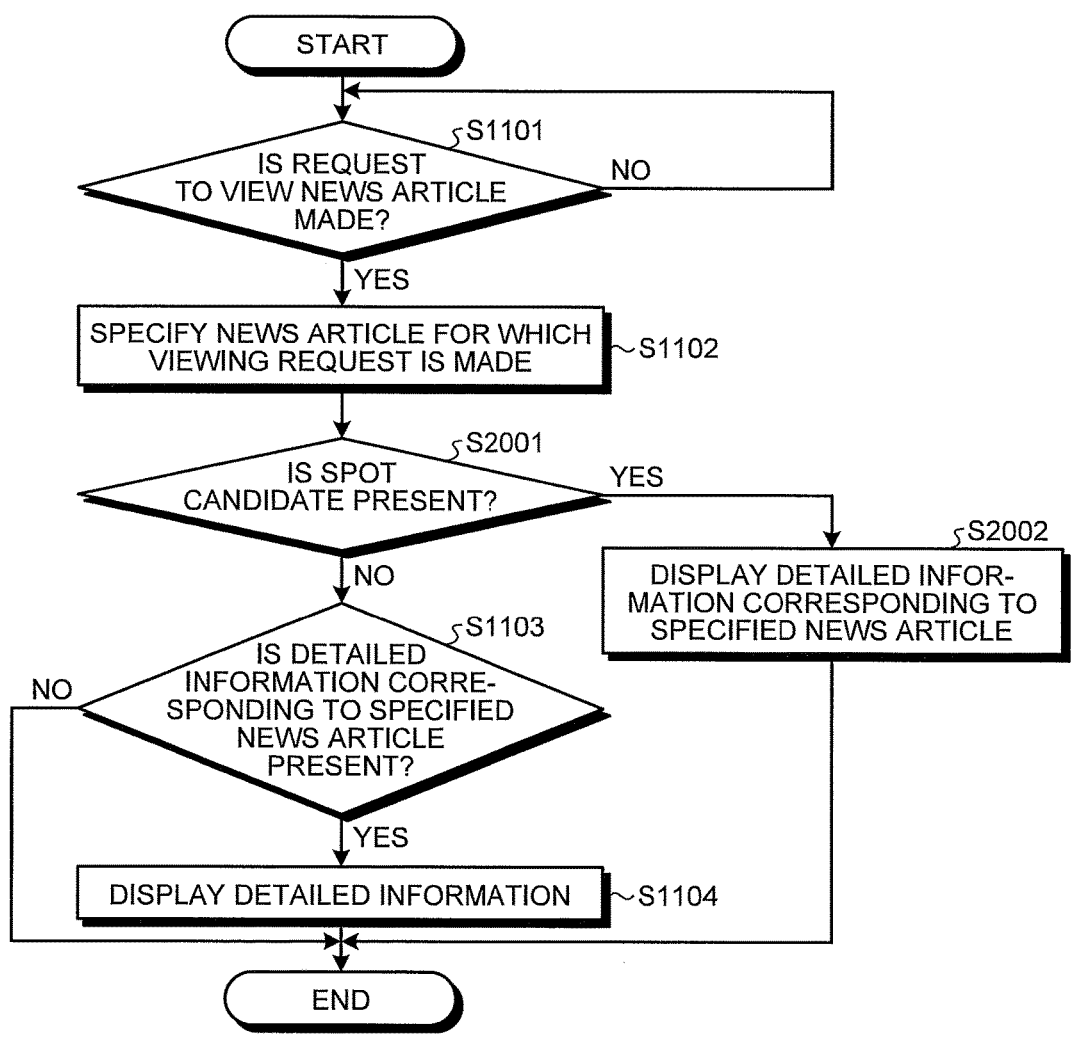
FIG. 20 is a flowchart illustrating a flow of detailed information provision processing performed by the detailed information providing server.

5. Flow of Detailed Information Provision Processing Performed by Detailed Information Providing Server Next, the flow of detailed information provision processing performed by the detailed information providing server 1740 will be described. FIG. 20 is a flowchart illustrating the flow of the detailed information provision processing performed by the detailed information providing server 1740. Note that among steps of the detailed information provision processing illustrated in FIG. 20, a step identical to that in the detailed information provision processing described with reference to FIG. 11 in the first embodiment will be assigned the same reference numeral to omit description of such step.

FIG. 20 is different from FIG. 11 in that steps S2001 and S2002 are added. In step S2001, a display content determination unit 912 searches the associated information 1800 on the basis of a news information ID identified in step S1102, and determines the presence/absence of a spot candidate associated with the news information ID identified in step S1102. The processing proceeds to step S2002 when the spot candidate is determined to be associated in step S2001.

In step S2002, the display content determination unit 912 extracts detailed information associated with the spot candidate from the associated information 1800 and determines the information to be display content displayed on a terminal. Moreover, a display control unit 913 performs control to display, on the terminal, the detailed information determined as the display content to be displayed on the terminal.

On the other hand, the processing proceeds to step S1103 when the spot candidate is determined to not be associated in step S2001. Note that each of steps S1103 and S1104 is identical to each of steps S1103 and S1104 in FIG. 11 and thus will not be described.

6. Summary

It is apparent from the aforementioned description that the detailed information providing server 1740 according to the present embodiment is configured to: • Connect to a spot information management server 110, a search server 120, and a news providing server 130, acquire the spot management information 400, search log information 500 and the news information 1600, and generate the associated information 1800 in which these pieces of information are associated; • Extract the spot candidate by analyzing the news article on the basis of the description pattern of the information on the spot and generate the associated information 1800 and, along with the generation of the associated information based on the description pattern, generate the associated information on the basis of the search query; and • Extract the detailed information associated with spot information (or the search query) of the news article from the associated information 1800 and perform control to display the detailed information along with the news article, when displaying the news article on the terminal.

As a result, when the news article includes a portion of the detailed information, the detailed information providing server 1740 uses the portion of the detailed information to be able to acquire the other detailed information. A user can obtain the detailed information on the spot when the news article is displayed on the terminal. That is, the detailed information desired by the user viewing the news article can be automatically provided to the user. As a result, the convenience for the user in acquiring information can be improved.

Fourth Embodiment

While the first to third embodiments are configured to determine the store name, address and phone number among the detailed information to be the display content and display these pieces of information when the news article is displayed, the embodiments are not limited to such configuration. It may be configured, for example, to determine detailed information other than the store name, address and phone number to be the display content and display such information when the news article is displayed.

Moreover, while the first to third embodiments are configured to display the detailed information when the news article is displayed, the embodiments are not limited to such configuration. It may be configured, for example, to display the search query stored in association with the news article in the associated information.

FIGS. 21A to 21C are diagrams each illustrating a display example of a display screen on a mobile terminal 150. FIG. 21A illustrates a case where the mobile terminal 150 is connected to the Internet, and an instruction to display a specific news article is input to the terminal after the terminal accesses a news site.

On the other hand, each of FIGS. 21B and 21C illustrates a case where detailed information is displayed upon input of the instruction to display the specific news article. FIG. 21B illustrates the case where a search query instead of the detailed information is displayed as display content. The search query being displayed, a user need not think of a search query on the basis of the news article.

FIG. 21C illustrates the case where word-of-mouth information and menu information instead of the address and phone number are displayed as the display content. The word-of-mouth information and menu information being displayed, the user can determine whether or not to use the store and need not perform a further search.

As a result, various information can be displayed when the news article is displayed since associated information 1800 stores the news article, a news information ID of news information including the news article, the search query, a spot candidate, and the detailed information in association with one another. Note that it may be configured to change which information to display depending on the news article.

Fifth Embodiment

While the query analysis unit 904 or the language pattern analysis unit 1701 of the first to fourth embodiments is configured to analyze one news article in generating the associated information for the one news article, the embodiments are not limited to such configuration.

It may be configured, for example, to analyze a plurality of news articles associated with one news article in generating the associated information of the one news article. This is because news articles covering the same news content may or may not include detailed information. In other words, when a news article not including the detailed information is to be analyzed, highly accurate detailed information can be provided by including a news article covering the same news content and including the detailed information as the news article to be analyzed. A fifth embodiment will be described below.

1. Description of News Information

There will be described news information 600 and 1600 each including a news article to be analyzed by a detailed information providing server 1740 according to the present embodiment. FIG. 22 is a diagram illustrating an example of the news information 600 and 1600. The news information 600 is a piece of news information for which the detailed information providing server 1740 generates associated information. The news information 1600 is a piece of news information covering the same news content as the news information 600. When generating the associated information of the news information 600, the detailed information providing server 1740 analyzes both a news article included in the news information 600 and a news article included in the news information 1600.

FIG. 22 illustrates an example where a search query "AA CCC" is included in the news article of the news information 600. In addition to the search query "AA CCC", a spot candidate "αααα" is included in the news article of the news information 1600.

The news article differs depending on a distribution source even when the content of the article is the same. As a result, when the associated information of the news information 600 is generated, a more accurate piece of information can be provided by analyzing the news article of the news information 1600 together.

2. Description of Associated Information

Next, there will be described associated information 2300 that is generated by the detailed information providing server 1740 according to the present embodiment by analyzing the news article included in each of the news information 600 and 1600 illustrated in FIG. 22. FIG. 23 is a table illustrating an example of the associated information 2300.

The news information 600 with a news information ID "news X" includes "AA" and "CCC" as expressions forming a search query, so that a query analysis unit 904 extracts "AA CCC" as a search query. Then, the extracted search query is stored in association with the news information ID "news X" into the associated information 2300.

The news information 600 does not include a spot candidate, so that a language pattern analysis unit 1701 at this point does not extract the spot candidate from the news information 600.

On the other hand, the news information 1600 with a news information ID "news Z" includes "AA" and "CCC" as expressions forming the search query, so that the query analysis unit 904 extracts "AA CCC" as the search query. Then, the extracted search query is stored in association with the news information ID "news Z" into the associated information 2300.

Moreover, a spot candidate "αααα" is included in the news information 1600 so that the language pattern analysis unit 1701 extracts "αααα" as the spot candidate. The extracted spot candidate is then stored in association with the news information ID "news Z" into the associated information 2300.

Here, it is assumed that a news article with the news information ID "news X" covers the same news content as a news article with the news information ID "news Z". Therefore, an analysis result of the news article with the news information ID "news Z" can be reflected in an analysis result of the news article with the news information ID "news X". As a result, the "spot candidate" of the news article with the news information ID "news Z" is stored under the "spot candidate" of the news article with the news information ID "news X".

The present embodiment as described above is configured to include, in addition to the analysis result of one news article, the analysis result of another news article having the same content as the one news article when generating the associated information for the one news article. The more accurate information can be provided as a result.

While the news article having the same content is used as the other news article to be analyzed in generating the associated information of the one news article, the embodiments are not limited to such case. A news article having relevant content may be used, for example.

The news article having relevant content is a news article having content that has a high degree of similarity with the one news article for which the associated information is generated, for example. Note that the news article with the high degree of similarity may be a news article, the entire content of which has a high degree of similarity, or a news article, the name of a place included in which has a high degree of similarity. Alternatively, the news article with the high degree of similarity may be a news article distributed at a timing close to the distribution timing of the one news article.

Sixth Embodiment

While the detailed information providing server 140 of the first to fifth embodiments is configured to acquire the spot management information, the search log information, and the news information upon triggered by the storing of the new piece of news information into the news information DB 132, the embodiments are not limited to such configuration. It may also be configured to acquire the spot management information and the search log information periodically after storing the new piece of news information and generate the associated information over again when the spot management information and the search log information are updated. Moreover, the spot management information and the search log information need not be acquired at a regular timing but may be acquired at a timing when the spot management information or the search log information is updated. Alternatively, it may be configured to acquire the spot management information and the search log information to generate the associated information over again every time a request to view the news article is received, and then display the detailed information.

The spot management information and the search log information are acquired after storing the news information as described above, whereby the spot management information and the search log information are updated to be able to be ready for a case when the detailed information and/or the score are/is modified.

Seventh Embodiment

While the second embodiment is configured to use the score determined on the basis of the maximum click count in the search log information 500 when selecting one search query among the plurality of search queries included in one news article, the embodiments are not limited to such configuration.

It may be configured, for example, to feed back a response of a user when the detailed information is displayed along with the news article and reflect it in the score.

The response of the user when the detailed information is displayed, along with the news article can be the number of searches performed by the user by using a search query, when the search query is displayed as the detailed information, for example. This is because the user is likely to perform a search on the basis of the search query being displayed when a search query used to search for the detailed information desired by the user viewing the news article matches the search query being displayed. To the contrary, the user is likely to perform a search by using another search query or not perform a search itself when a search query used to search for the detailed information desired by the user viewing the news article does not match the search query being displayed. That is, the degree of association between the search query displayed as the detailed information and the news article can be calculated by monitoring the use status of the search query displayed as the detailed information.

Moreover, the response of the user when the detailed information is displayed along with the news article can be the number of searches performed by using an expression associated with a store name, an address and a phone number as the search query, when these contents are displayed as the detailed information, for example. This is because the user is likely to perform a further search by using the expression associated with the displayed contents as the search query when the detailed information desired by the user viewing the news article roughly matches the displayed contents. To the contrary, the user is likely to perform a search by using an expression entirely different from the displayed contents as the search query when the detailed information desired by the user viewing the news article is largely different from the displayed contents.

Moreover, the response of the user when the detailed information is displayed along with the news article can be a ratio the user actually visits a store when the store name, address and phone number are displayed as the detailed information, for example. This is because the user is likely to visit the store when the detailed information desired by the user viewing the news article is the detailed information on the store. To the contrary, the user is very unlikely to visit the store being displayed when the detailed information desired by the user viewing the news article is detailed information on not that store but another store, or when the user does not want store information itself. It may be determined whether or not the store is visited by the user on the basis of whether or not position information of a mobile terminal of the user matches latitude/longitude corresponding to the store while logging the position information of the mobile terminal of the user.

Eighth Embodiment

While the news article is analyzed in the first to seventh embodiments, the detailed information providing server does not only analyze the news article. Any text data can be analyzed as long as it is published on the Internet. Note that the text data in this case includes a blog and a short composition posting service. Alternatively, the text data includes metadata added to image data or video data that can be viewed on a network. In other words, the detailed information providing server can analyze any text data that can be acquired on the network.

Moreover, while the first to seventh embodiments are configured to connect to the spot information management server 110 and acquire the spot management information, the embodiments are not limited to such configuration. It may also be configured to connect to a server other than the spot information management server 110 to acquire information other than the spot management information and store it as detailed information into associated information.

According to each embodiment of the present invention, the convenience in acquiring information can be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information providing server for providing a web news article and detailed information associated with each other via a network, the information providing server comprising:
   a memory comprising a first database that stores detailed information and web news articles in association with each other; and
   a processor operatively connected to the memory, the processor programmed to:
      (i) upon receiving a new web news article:
         determine whether a search query keyword having a use frequency above a threshold is included in the new web news article; and
         in response to the search query keyword having the use frequency above the threshold being included in the new web news article:
            acquire search log information including the search query keyword and link destination information associated with each other, the link destination information being obtained, as a search result, from a previous search based on the search query keyword;
            identify a uniform resource locator (URL) of the link destination information obtained by using the search query keyword;
            acquire information related to a physical location or store having the identified URL; and
            store, in the first database, the information related to the physical location or store as detailed information desired by a user viewing the new web news article in association with the new web news article; and
      (ii) upon detecting that a request to view the new web news article is made from a user terminal: automatically transmit, to the user terminal via the network, the stored new web news article and the information related to the physical location or store as the detailed information desired by the user viewing the new web news article, so as to cause the user terminal to together display the new web news article and the information related to the physical location or store.

2. The information providing server according to claim 1, wherein the processor is further programmed to: perform control to cause a display of the user terminal to display, as the detailed information, text data.

3. The information providing server according to claim 2, wherein
   the text data is first text data, and
   the processor is further programmed to:
      determine whether or not information on a spot is included in second text data; and
      in response to determining that information on the spot is included in the second text data:
         store, in the one or more memories, detailed information in association with the second text data when determining that the information on the spot is included in the second text data, the second text data being acquired by making access according to the link destination information, which is associated in advance with the information on the spot; and
         upon detecting that the request to view the new web news article is made from the user terminal: cause the display of the user terminal to display the second text data when the second text data is stored as the detailed information in association with the spot; and
      in response to determining that information on the spot is not included in the second text data: upon detecting that the request to view the new web news article is made from the user terminal: cause the display of the user terminal to display the first text data, when the second text data is not stored as the detailed information in association with the spot.

4. The information providing server according to claim 3, wherein the processor is further programmed to:
   when it is determined that the search query keyword is included in the first text data, select one search query keyword, as the search query keyword, according to degrees of association between each of the plurality of search query keywords and the first text data prior to storing the detailed information in association with the first text data in the first database.

5. The information providing server according to claim 4, wherein the processor is further programmed to determine the degrees of association according to the number of accesses made on the basis of link destination information of a search result obtained by a search using each of the plurality of search query keywords.

6. The information providing server according to claim 4, wherein the degrees of association are determined according to responses of users to display of the detailed information.

7. The information providing server according to claim 2, wherein the processor is further programmed to: cause a display of the user terminal to display the search query keyword instead of the text data as the detailed information.

8. The information providing server according to claim 1, wherein
   the text data is first text data, and
   the processor is further programmed to:

determine whether or not a keyword corresponding to the search query keyword is included in second text data, content of which is relevant to content of the first text data; and store, as the detailed information, the second text data upon determining that the keyword corresponding to the search query keyword is included in the second text data.

9. The information providing server according to claim 1, wherein the text data is first text data, and the processor is further programmed to:
determine whether or not information on a spot is included in second text data, content of which is relevant to content of the first text data, and
store, as the detailed information, the second text data upon determining that the information on the spot is included in the second text data.

10. The information providing server according to claim 3, wherein the text data is first text data, and the processor is further programmed to:
determine whether or not information on a spot is included in second text data, content of which is relevant to content of the first text data, and
store, as the detailed information, the second text data upon determining that the information on the spot is included in the second text data.

11. An information providing system comprising:
a management server configured to manage detailed information acquired by making access on the basis of link destination information and store the detailed information in association with the link destination information;
a search server configured to store search log information including a search query keyword and link destination information associated with each other, the link destination information being obtained, as a search result, from a previous search based on the search query keyword;
a storage server configured to store web news articles available on a network; and
an information providing server for providing a web news article and detailed information associated with each other via the network, the information providing server configured to be communicably connected to the management server, the search server, and the storage server via the network, wherein the information providing server comprises:
a memory comprising a first database that stores detailed information and web news articles in association with each other; and
a processor operatively connected to the first database, the processor programmed to:
(i) upon receiving a new web news article:
determine whether a search query keyword having a use frequency above a threshold is included in the new web news article; and
in response to the search query keyword having the use frequency above the threshold being included in the new web news article:
acquire, from the search server, the search log information including the search query keyword and the associated link destination information, the link destination information being obtained, as a search result, from a previous search based on the search query keyword;
identify a uniform resource locator (URL) of the link destination information obtained by using the search query keyword;
acquire, from the management server, information related to a physical location or store having the identified URL;
store, in the first database, the information related to the physical location or store as detailed information desired by a user viewing the new web news article in association with the new web news article; and
(ii) upon detecting that a request to view the new web news article is made from a user terminal: automatically transmit, to the user terminal via the network, the stored new web news article and the information related to the physical location or store as the detailed information desired by the user viewing the new web news article, so as to cause the user terminal to together display the new web news article and the information related to the physical location or store.

12. An information providing method for providing a web news article and detailed information associated with each other via a network, the information providing server comprising:
(i) upon receiving a new web news article:
determining, by a processor, whether a search query keyword having a use frequency above a threshold is included in the new web news article; and
in response to the search query keyword having the use frequency above the threshold being included in the new web news article:
acquiring, by the processor, search log information including the search query keyword and link destination information associated with each other, the link destination information being obtained, as a search result, from a previous search based on the search query keyword;
identifying, by the processor, a uniform resource locator (URL) of the link destination information obtained by using the search query keyword;
acquiring, by the processor, information related to a physical location or store having the identified URL;
storing, by the processor in a first database of a memory coupled to the processor, the information related to the physical location or store as detailed information desired by a user viewing the new web news article in association with the new web news article; and
(ii) upon detecting that a request to view the new web news article is made from a user terminal: automatically transmitting, by the processor to the user terminal via the network, the stored new web news article and the information related to the physical location or store as the detailed information desired by the user viewing the new web news article, so as to cause the user terminal to together display the new web news article and the information related to the physical location or store.

* * * * *